US011862956B2

(12) United States Patent
Naugler et al.

(10) Patent No.: US 11,862,956 B2
(45) Date of Patent: Jan. 2, 2024

(54) MULTI-DIRECTIONAL CABLE CLIP

(71) Applicant: Hubbell Incorporated, Shelton, CT (US)

(72) Inventors: Kurt Leslie Gray Naugler, Bedford, NH (US); Evan Ronald Martin, Merrimack, NH (US)

(73) Assignee: Hubbell Incorporated, Shelton, CT (US)

( * ) Notice: Subject to any disclaimer, the term of this patent is extended or adjusted under 35 U.S.C. 154(b) by 154 days.

(21) Appl. No.: 17/091,862

(22) Filed: Nov. 6, 2020

(65) Prior Publication Data

US 2021/0057897 A1 Feb. 25, 2021

Related U.S. Application Data

(62) Division of application No. 16/675,047, filed on Nov. 5, 2019, now Pat. No. 10,847,960.

(60) Provisional application No. 62/848,632, filed on May 16, 2019.

(51) Int. Cl.
H02G 3/32 (2006.01)
H01R 4/64 (2006.01)
F16L 3/13 (2006.01)
F16L 3/23 (2006.01)
H02S 40/30 (2014.01)
H01R 4/2404 (2018.01)

(52) U.S. Cl.
CPC ............... H02G 3/32 (2013.01); F16L 3/13 (2013.01); F16L 3/23 (2013.01); H01R 4/64 (2013.01); H02S 40/30 (2014.12); H01R 4/2404 (2013.01)

(58) Field of Classification Search
CPC ........ H05K 3/3405; H05K 2201/10386; F16L 35/121; F16L 3/13; F16L 3/23; H02G 3/32; H02S 40/30; H01R 4/64; H01R 4/2404
USPC ....... 248/72, 74.2, 689, 58, 60, 62, 68.1, 71, 248/74.1, 300, 316.7
See application file for complete search history.

(56) References Cited

U.S. PATENT DOCUMENTS

| 942,693 | A | | 12/1909 | Wintermute |
| 1,332,004 | A | | 2/1920 | Rawleigh |
| 1,398,519 | A | | 11/1921 | Hosch |
| 2,061,463 | A | | 11/1936 | Hall |
| 2,453,980 | A | * | 11/1948 | Hartman ............ F16L 3/13 248/68.1 |
| 2,543,336 | A | | 2/1951 | Ratchford |
| 2,594,211 | A | * | 4/1952 | Ougljesa ............ F16L 3/04 24/339 |
| 2,618,033 | A | | 11/1952 | Tinnerman |

(Continued)

FOREIGN PATENT DOCUMENTS

CA 2824260 2/2014

Primary Examiner — Christopher Garft
Assistant Examiner — Michael McDuffie
(74) Attorney, Agent, or Firm — Wissing Miller LLP

(57) ABSTRACT

A wire management clip includes a cable pocket, a first clip pocket with an opening to receive a structure, and a second clip pocket with an opening to receive a structure. The opening of the first clip pocket is accessible from one direction relative to the wire management clip, and the opening of the second clip pocket is accessible from another direction relative to the wire management clip. The wire management clip may also include one or more structure engaging members for engaging or contacting a surface of the structure received within the first clip pocket and the second clip pocket.

20 Claims, 22 Drawing Sheets

(56) References Cited

U.S. PATENT DOCUMENTS

| | | | |
|---|---|---|---|
| 2,712,917 A | 7/1955 | Flora | |
| 3,003,736 A | 10/1961 | Hofgesang | |
| 3,020,602 A | 2/1962 | Siering | |
| 3,049,042 A | 8/1962 | De | |
| 3,131,447 A | 5/1964 | Tinnerman | |
| 3,208,119 A | 9/1965 | Seckerson | |
| 3,216,685 A * | 11/1965 | Raymond | H02G 3/32 |
| | | | 248/74.2 |
| 3,262,662 A | 7/1966 | Gastaldi | |
| 3,528,050 A | 9/1970 | Hindeburg | |
| 3,626,553 A * | 12/1971 | Darney et al. | A63C 11/02 |
| | | | 24/336 |
| 3,983,602 A | 10/1976 | Barry | |
| 4,043,527 A | 8/1977 | Franzmeier | |
| 4,087,149 A | 5/1978 | Fischer | |
| 4,406,505 A | 9/1983 | Avramovich | |
| 4,875,876 A | 10/1989 | O'Loughlin | |
| 5,148,981 A | 9/1992 | Lynch, Jr. | |
| 5,188,318 A | 2/1993 | Newcomer | |
| 5,347,691 A | 9/1994 | Terazoe | |
| 5,441,429 A | 8/1995 | Seidler | |
| 5,451,167 A | 9/1995 | Zielinski | |
| 5,463,189 A | 10/1995 | Deneke | |
| 5,593,327 A | 1/1997 | Hlinsky | |
| 5,787,556 A * | 8/1998 | Terzian | A47F 5/0884 |
| | | | 24/3.12 |
| 5,823,483 A | 10/1998 | Gaskill | |
| 6,106,310 A | 8/2000 | Davis | |
| 6,186,799 B1 | 2/2001 | Mello | |
| 6,234,835 B1 | 5/2001 | Bakker | |
| 6,303,861 B1 * | 10/2001 | Dobrinski | H01R 4/186 |
| | | | 174/94 R |
| 6,477,744 B1 | 11/2002 | Miles | |
| 6,667,872 B2 | 12/2003 | Hsu | |
| 7,152,831 B2 | 12/2006 | Riedy | |
| 7,607,618 B2 | 10/2009 | Mori | |
| 7,686,625 B1 | 3/2010 | Dyer | |
| 7,717,387 B2 * | 5/2010 | Naheem | B60M 5/00 |
| | | | 238/351 |
| 8,025,508 B2 | 9/2011 | Parker | |
| 8,974,245 B2 | 3/2015 | Kovalov | |
| 8,998,660 B2 | 4/2015 | Bakos | |
| 9,021,667 B2 | 5/2015 | Wasco | |
| 9,086,175 B2 | 5/2015 | Wasco | |
| 9,341,285 B2 * | 5/2016 | Magno, Jr. | F16L 3/10 |
| D806,529 S | 1/2018 | Olenick | |
| 9,903,511 B2 * | 2/2018 | Vermillion | F16L 3/137 |
| 10,208,874 B2 * | 2/2019 | Geiger | H02S 30/00 |
| 10,253,905 B2 | 4/2019 | Martin | |
| 10,298,169 B2 | 5/2019 | Martin | |
| 10,550,870 B2 * | 2/2020 | Lewis | F16L 3/13 |
| 10,847,960 B1 * | 11/2020 | Naugler | H01R 4/64 |
| 2008/0078891 A1 | 4/2008 | Hobson | |
| 2009/0045310 A1 | 2/2009 | Koesema, Jr. | |
| 2010/0192334 A1 | 8/2010 | Reichle | |
| 2012/0192925 A1 | 8/2012 | Grushkowitz | |
| 2014/0061396 A1 | 3/2014 | Magno, Jr. | |
| 2019/0081469 A1 * | 3/2019 | Shea | H02G 3/32 |
| 2020/0149662 A1 * | 5/2020 | Lewis | F16B 7/0433 |
| 2022/0060006 A1 * | 2/2022 | Naugler | F16L 3/233 |
| 2022/0102951 A1 * | 3/2022 | Badrenas | B60R 16/0215 |

* cited by examiner

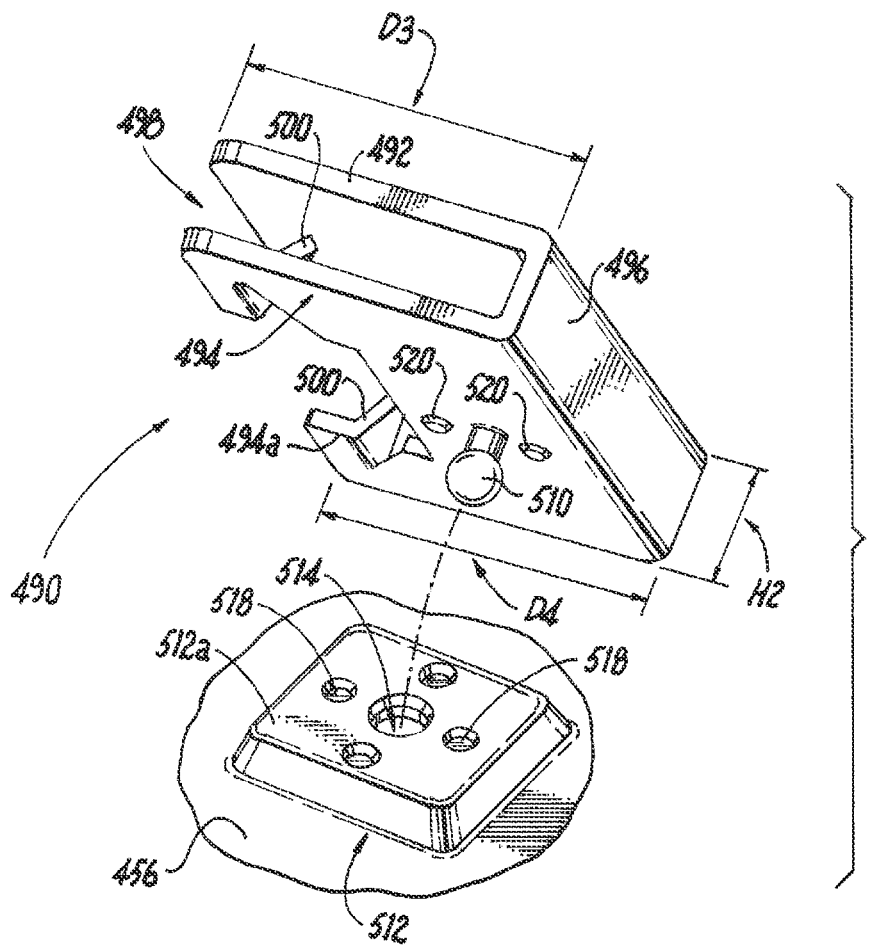
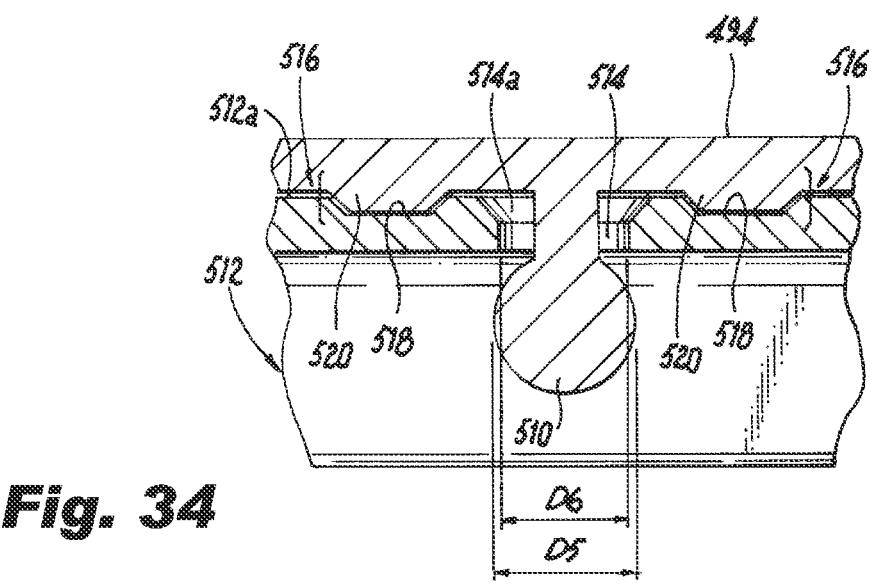
Fig. 33
Fig. 34

MULTI-DIRECTIONAL CABLE CLIP

CROSS REFERENCE TO RELATED APPLICATIONS

This application is a divisional of application Ser. No. 16/675,047 filed on Nov. 5, 2019, and claims benefit from benefit from U.S. Provisional Application Ser. No. 62/848,632 filed on May 16, 2019 the contents of both are herein incorporated by reference in their entirety.

BACKGROUND

Field

The present disclosure relates generally to cable clips, and more particularly to cable clips for wire management.

Description of the Related Art

In recent years, the use of photovoltaic arrays to provide electrical power in commercial, residential, and other environments has become popular. Photovoltaic arrays are generally composed of a number of photovoltaic modules set within a metallic frame and a rail system that supports the photovoltaic modules. Flanges of the metal frames are used to attach the metallic frames to the rail system, and the rail system is attached to a support structure, such as a roof or the ground. When installing a photovoltaic array, a number of photovoltaic modules are assembled onto the rail system. The metallic frames of the individual photovoltaic modules, and the structural pieces, e.g., the rails, on which the modules are mounted are generally made out of aluminum. Depending upon the size of the photovoltaic array, the rail system may include multiple metallic rails coupled or connected together in a grid-like pattern. As with other sources of electrical power, to ensure the integrity of wires running along the metal frames of the photovoltaic modules, a clip is needed in which electrical cables can be mounted.

A recent trend in the solar industry is to further reduce costs by reducing the material needed to fabricate the metallic frames of photovoltaic modules and to reduce the material needed to fabricate the rail systems. One trend to reduce the material used to fabricate the metallic frames and rail systems is to shorten flanges on the metallic frames used to attach the photovoltaic modules to the rail system. This reduction in the flange size has necessitated improvements in the cable clips used to manage the routing of electrical wires along the metallic frames of photovoltaic modules and the rail systems.

SUMMARY

The present disclosure provides embodiments of wire management clips. In one exemplary embodiment, a wire management clip includes a base member, a first arm, a second arm, a first clip pocket and a second clip pocket. The first arm extends from a first end portion of the base member and has a free end. The first arm includes at least one structure engaging member extending therefrom. The second arm extends from a second end portion of the base member and has a free end such that a cable receiving opening is formed between the first arm and the second arm. The second arm includes at least one structure engaging member extending therefrom. The first clip pocket extends from the first arm and forms an opening capable of receiving a portion of a structure. The second clip pocket extends from the second arm and forms an opening capable of receiving a portion of the structure. Preferably the first clip opening is oriented to permit entry of the structure from a first direction relative to the wire management clip and the second clip opening is oriented to permit entry of the structure from a second direction relative to the wire management clip.

In another exemplary embodiment, a wire management clip includes a base member, a first arm, a second arm, a first clip pocket and a second clip pocket. The first arm extends from a first end portion of the base member and has a free end with a first lead-in. The first arm has at least one structure engaging member extending therefrom. The second arm extends from a second end portion of the base member and has a free end with a second lead-in such that a cable receiving opening is formed between the first arm and the second arm, and such that the second lead-in opposes the first lead-in and a gap is formed between the first lead-in and the second lead-in. The second arm has at least one structure engaging member extending therefrom. The first clip pocket extends from the first arm and forms an opening capable of receiving a portion of a structure. The second clip pocket extends from the second arm and forms an opening capable of receiving a portion of the structure. Preferably, the first clip opening is oriented to permit entry of the structure from a first direction relative to the wire management clip, and the second clip opening is oriented to permit entry of the structure from a second direction relative to the wire management clip.

In another exemplary embodiment, a wire management clip includes a base member, a first arm, a second arm, a first clip pocket and a second clip pocket. The first arm extends from a first end portion of the base member and has a free end. The second arm extends from a second end portion of the base member and has a free end such that a cable receiving opening is formed between the first arm and the second arm. The first clip pocket extends from the first arm and forms an opening capable of receiving a portion of a structure. The first clip pocket has at least one structure engaging member extending into the first clip pocket opening. The second clip pocket extends from the second arm and forms an opening capable of receiving a portion of the structure. The second clip pocket has at least one structure engaging member extending into the second clip pocket opening. Preferably, the first clip opening is oriented to permit entry of the structure from a first direction relative to the wire management clip, and the second clip opening is oriented to permit entry of the structure from a second direction relative to the wire management clip.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 33 is an exploded perspective view of the clip pocket and a socket housing of the arm of the cable pocket, illustrating a ball extending from the clip pocket and an aperture in the socket housing that receives the ball;

FIG. 34 is a cross sectional view of a portion of the clip pocket and socket housing of FIG. 33 taken from line 34-34, illustrating the ball of the clip pocket within the aperture of the socket housing.

DETAILED DESCRIPTION

Figure 1:
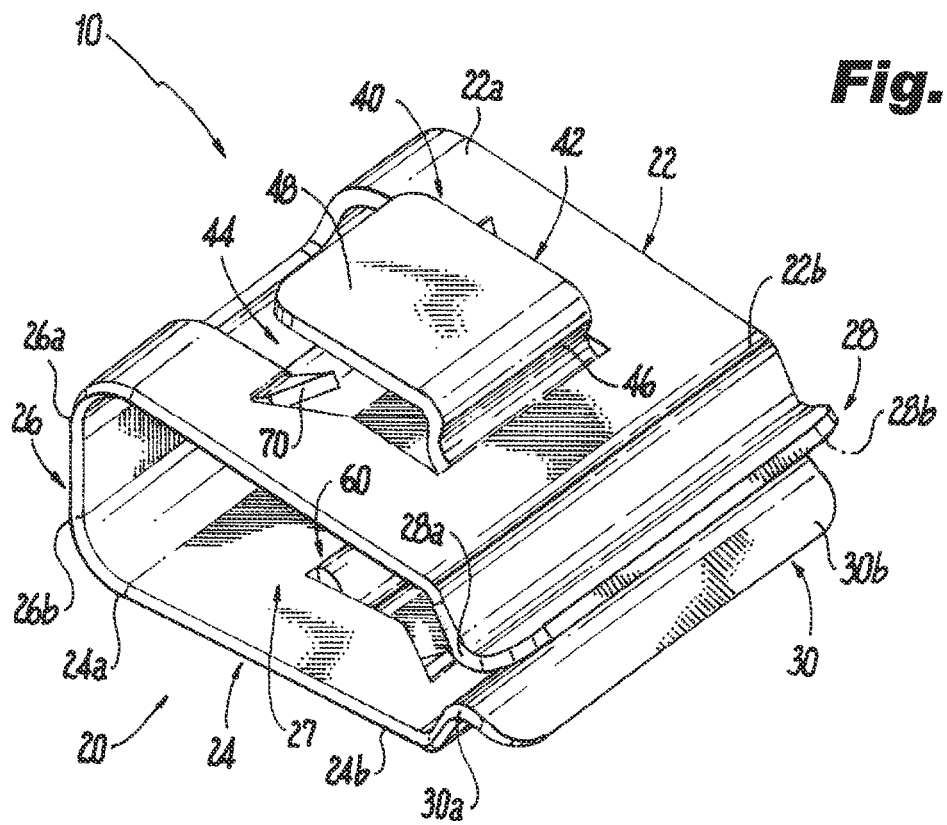
FIG. 1 is a perspective view of a top side of an exemplary embodiment of a wire management clip according to the present disclosure.
Figure 2:
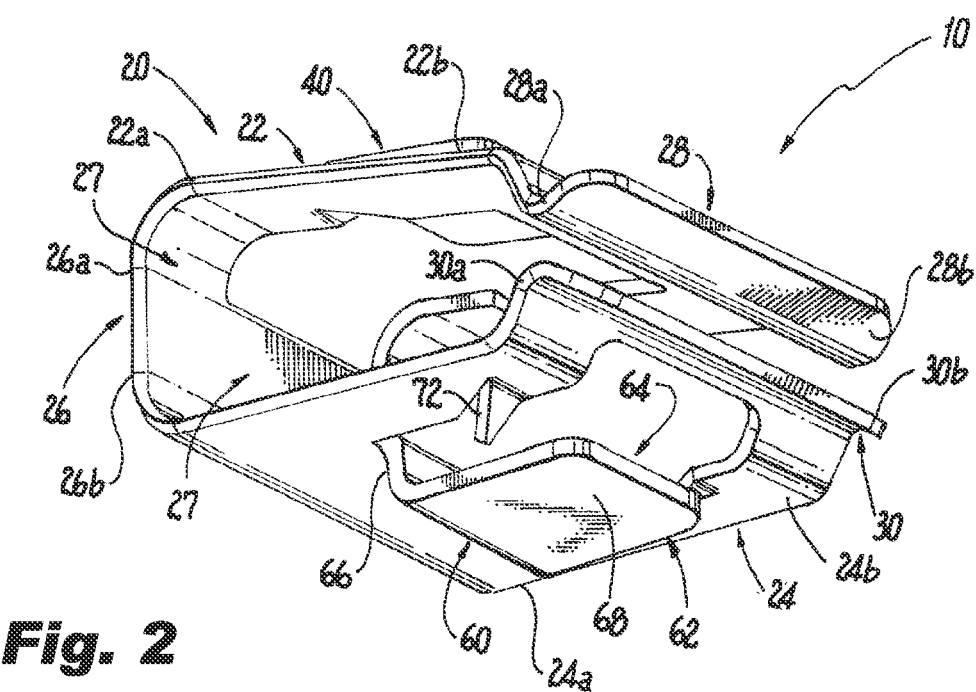
FIG. 2 is a perspective view of a bottom side of the wire management clip of FIG. 1.

The present disclosure provides exemplary embodiments of wire management clips. The wire management clips according to the present disclosure include multiple clip pockets and one or more cable pockets. The multiple clip pockets allow the wire management clip to be attached to a structure in different positions where lead-ins of the wire management clips face in different directions relative to the structure to which the clip is attached. The wire management clips may include one or more structure engaging members that improve the grip between a clip pocket and a portion of the structure to which the wire management clip is attached. The structure engaging members may be teeth, raised surfaces, ribs, tabs or other structures that can engage and grip the structure, or that can engage the structure and create a friction force or a friction fit between the wire management clip and the portion of the structure to which the wire management clip is attached. For ease of description, the wire management clips may also be referred to herein as the "clips" in the plural and the "clip" in the singular.

The one or more wire management pockets are configured and dimensioned to receive and hold, for example, one or more cables or wires. The term "wire" is used herein in a general sense and refers to any type and size of electrical conductor. The wire may be a solid wire or a stranded wire. The wire may be insulated or non-insulated. The cable may be multiple wires encased within an outer jacket. The one or more cables or wires may also be collectively referred to herein as the "cables" in the plural and the "cable" in the singular. The structures that the wire management clips may be attached to include structures with short or long flanges extending therefrom or other structures with other extensions extending therefrom. Non-limiting examples of the structures that the wire management clips may be attached include frames of photovoltaic modules and rails of a photovoltaic arrays.

The clips according to the present disclosure may be constructed from non-metallic materials or metallic materials that can flex when a force is applied to the clips as described in more detail below. Non-limiting examples of non-metallic materials include plastic, nylon and rubber. Non-limiting examples of metallic materials include spring steel and stainless steel.

Referring to FIGS. 1-8, an exemplary embodiment of a wire management clip according to the present disclosure is shown. The clip 10 includes one or more cable pockets and one or more clip pockets. In the exemplary embodiment shown there is a single cable pocket 20 and two clip pockets; a first clip pocket 40 and a second clip pocket 60. As shown in FIGS. 1-4, the cable pocket 20 is formed by a first arm 22, a second arm 24 and a base 26. The first arm 22, the second arm 24 and the base 26 are configured and dimensioned to form an opening 27 that can receive and hold one or more cables.

Continuing to refer to FIGS. 1-4, the first arm 22 has a first end portion 22a and a second end portion 22b. The first end portion 22a of the first arm 22 may be integrally or monolithically formed to one end 26a of the base 26. In another exemplary embodiment, the first end portion 22a may be secured to the base 26 using fasteners, welds or adhesives. The second end portion 22b of the first arm 22 is a free end that may include a lead-in 28. The lead-in may be a rounded edge, a U-shaped like member, a V-shaped like member or other type of member that facilitates easier entry of cables into the opening 27 of the cable pocket 20, that facilitates the flexing of the first arm 22 relative to the base 26 and/or that facilitates holding cables within the opening 27 of the cable pocket 20. The lead-in 28 is in this exemplary embodiment is a U-shape like member with a curved member 28a and a flared member 28b that facilitates flexing of the first arm 22 relative to the base 26 when inserting a cable into the cable pocket 20.

The second arm 24 has a first end portion 24a and a second end portion 24b. The first end portion 24a of the second arm 24 may be integrally or monolithically formed to one end 26b of the base 26. In another exemplary embodiment, the first end portion 24a may be secured to the base 26 using fasteners, welds or adhesives. The second end portion 24b of the second arm 24 is a free end that may include a lead-in 30. The lead-in 30 may be a rounded edge, a U-shaped like member, a V-shaped like member or other type of member that facilitates easier entry of cables into the cable pocket 20, that facilitates the flexing of the second arm 24 relative to the base 26, and/or that facilitates holding cables within the opening 27 of the cable pocket 20. The lead-in 30 is in this exemplary embodiment a U-shape like member with a curved member 30a and a flared member 30b that facilitates flexing of the second arm 24 relative to the base 26 when inserting a cable into the cable pocket 20. While the lead-ins 28 and 30 are described herein as U-shaped like members, the present disclosure contemplates that the lead-ins may be in a number of different shapes and sizes, such as a rounded edge or V-shaped like member, that facilitate easier insertion of one or more cables into the cable pocket 20, that facilitate the flexing of the first and second arms 22 and 24 relative to the base 26, and/or that facilitate holding cables within the opening 27 of the cable pocket 20. Further, the flared member 28b of lead-in 28 and the flared member 30b of lead-in 30 are bent away from each other, as shown in FIGS. 3 and 4, to minimize and possibly prevent any sharp edges from coming into contact with cables received in, held by and/or withdrawn from the cable pocket 20.

Figure 3:
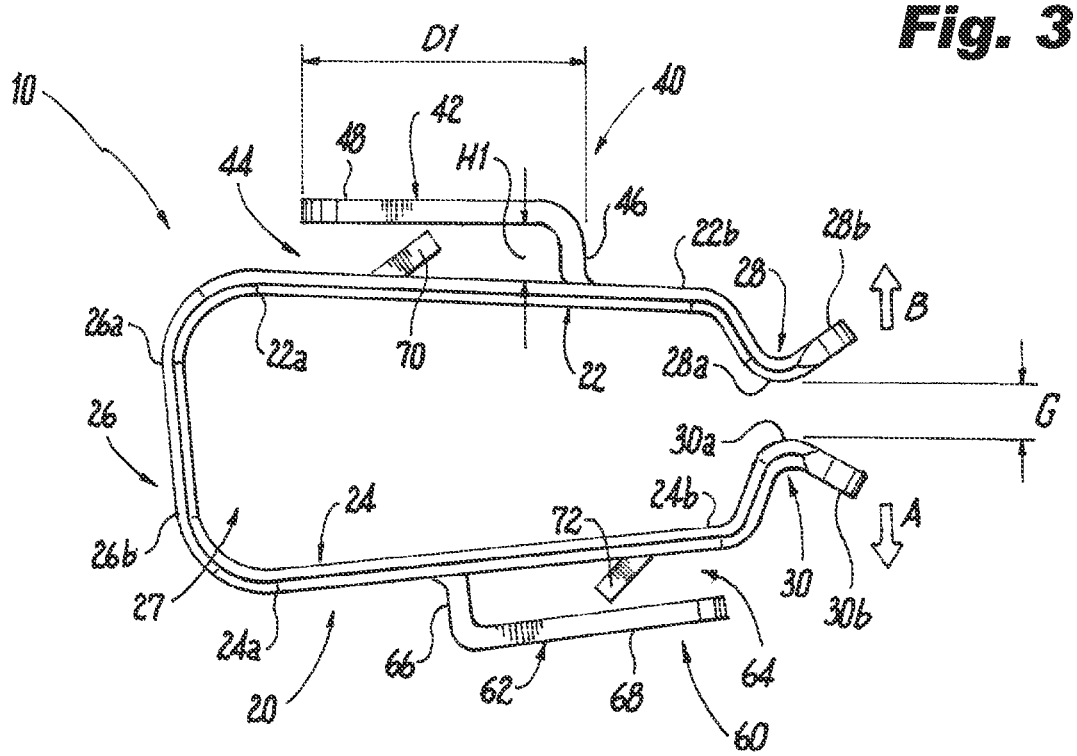
FIG. 3 is a side elevation view of a first side of the wire management clip of FIG. 1.
Figure 4:
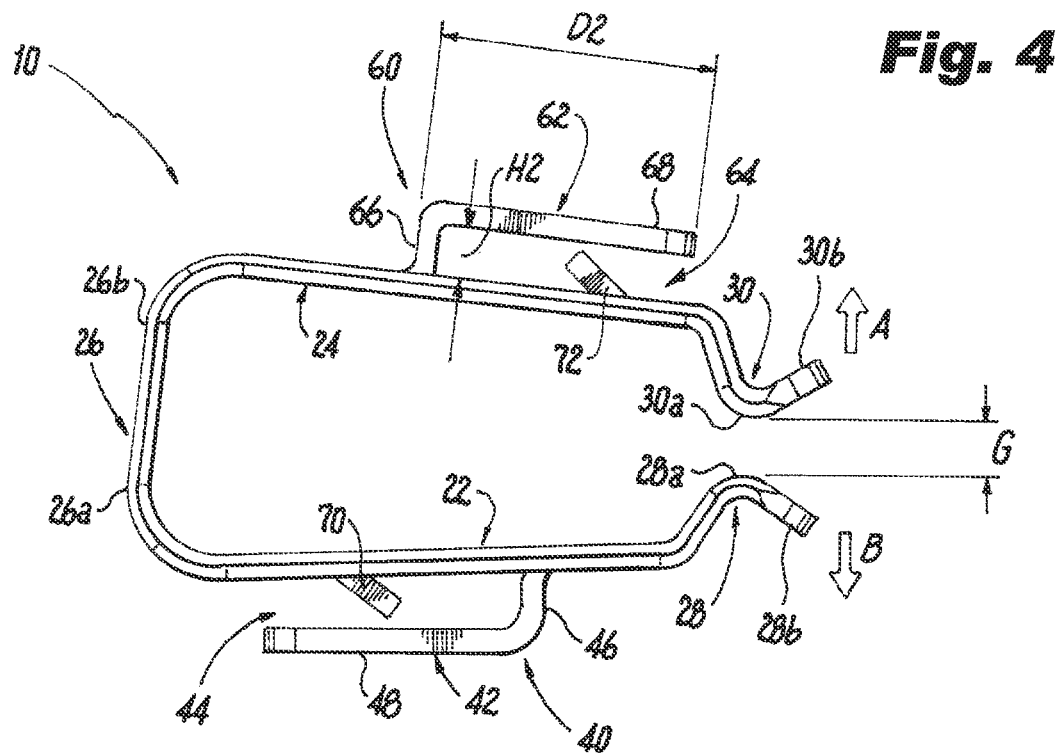
FIG. 4 is a side elevation view of a second side of the wire management clip of FIG. 1.
Figure 5:
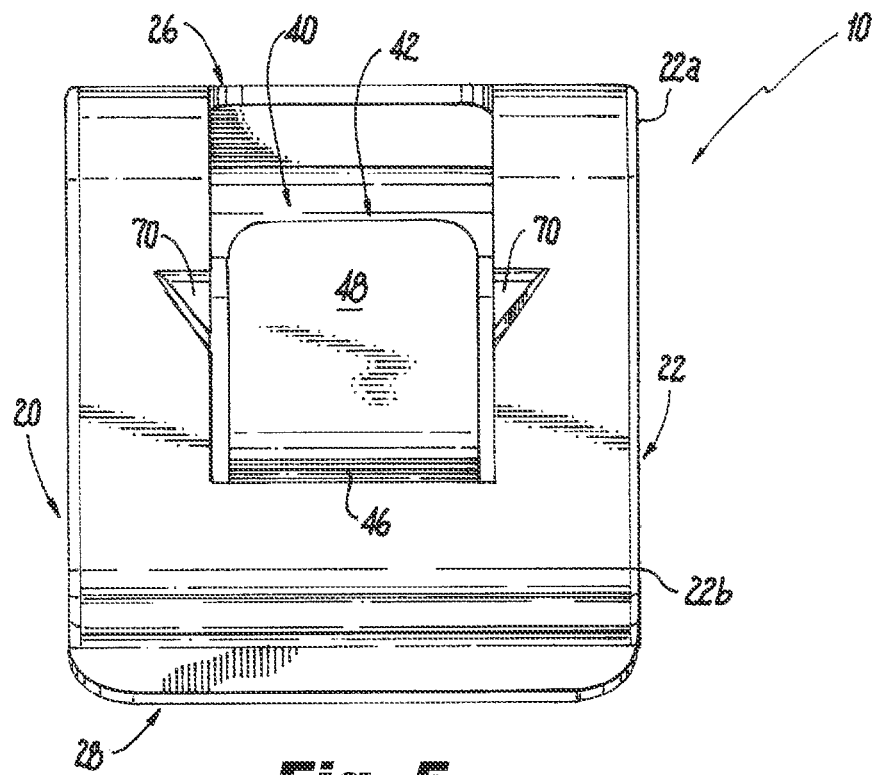
FIG. 5 is a top plan view of the wire management clip of FIG. 1.
Figure 6:
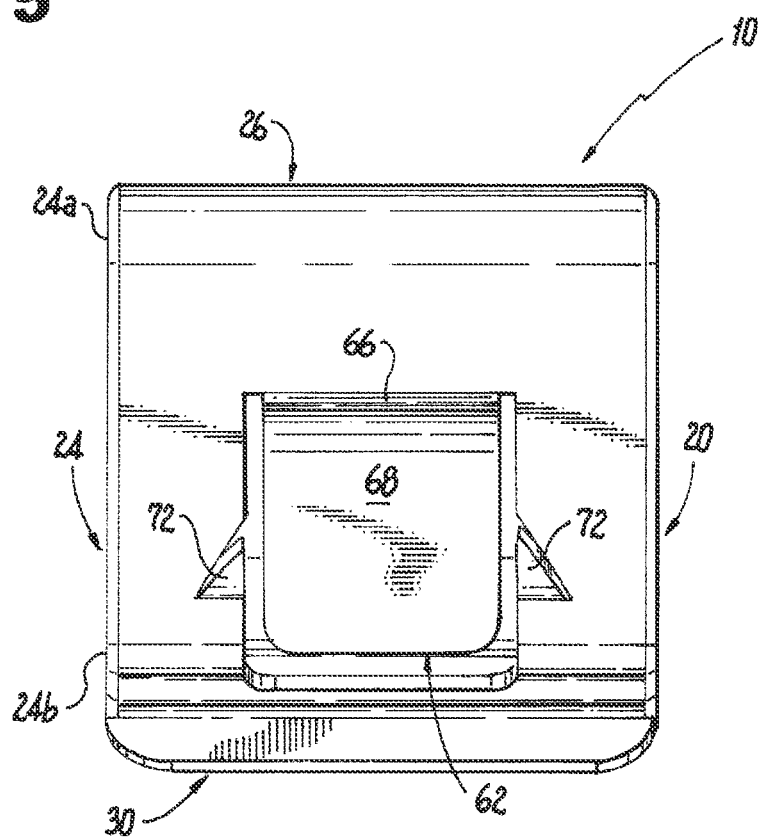
FIG. 6 is a bottom plan view of the wire management clip of FIG. 1.
Figure 7:
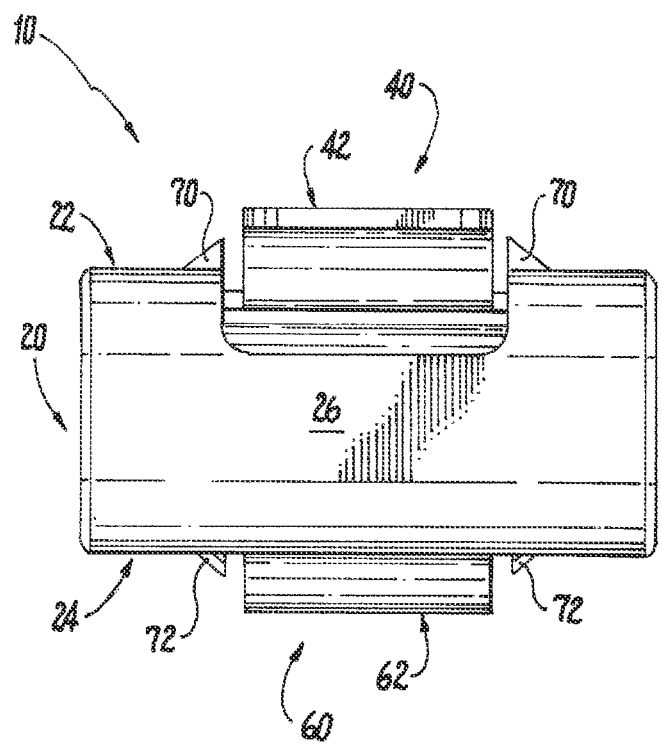
FIG. 7 is a rear elevation view of the wire management clip of FIG. 1.
Figure 8:
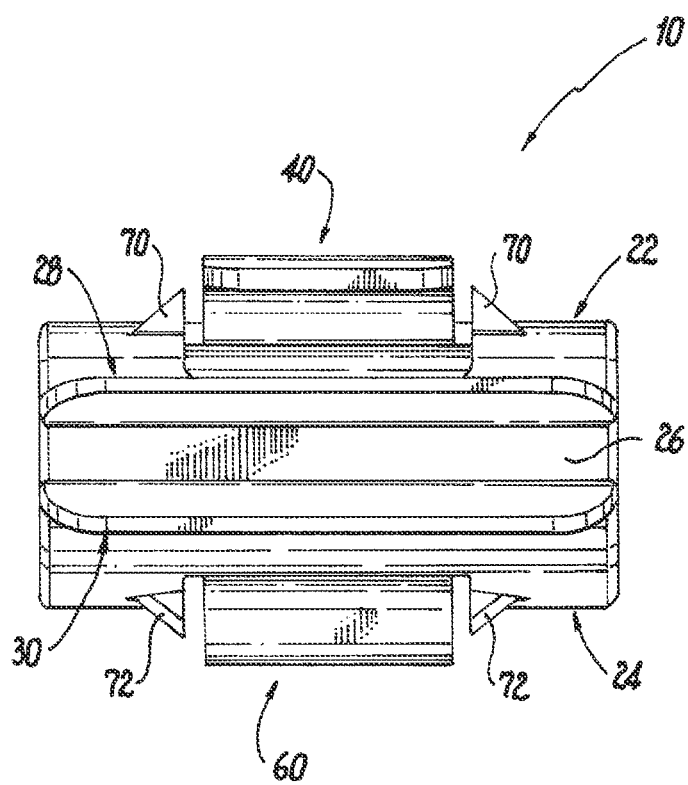
FIG. 8 is a front elevation view of the wire management clip of FIG. 1.

Continuing to refer to FIGS. 3 and 4, when the lead-ins 28 and 30 are in a normal state, there is a gap "G" between the curved member 28a of the lead-in 28 and the curved member 30a of the lead-in 30. The gap "G" is generally smaller than a diameter of the one or more cables to be received into and held by the cable pocket 20. Having a gap "G" that is smaller than a diameter of the one or more cables to be received into and held by the cable pocket 20 prevents the one or more cables from exiting the cable pocket 20 unless sufficient force is applied to the lead-in 28 to cause the first arm 22 to move away from the second arm 24, and/or sufficient force is applied to the lead-in 30 to cause the second arm 24 to move away from the first arm 22. For example, in instances where the clip pocket 60 is attached to a structure, seen in FIG. 9, when the first arm 22 is urged away from the second arm 24 as shown by arrow B in FIGS. 4 and 9, the gap "G" between the lead-in 28 and the lead-in 30 increases allowing one or more cables, e.g., cables 600, 602 and 604 seen in FIG. 9, to be inserted between the lead-ins 28 and 30 into the opening 27 of the cable pocket 20, or allowing one or more cables, e.g., cables 600, 602 and 604, to be withdrawn from the opening 27 of the cable pocket 20 via the lead-ins 28 and 30.

Referring again to FIG. 3, the first clip pocket 40 is formed by a first clip bracket 42 that may be integrally or monolithically formed into the first arm 22, or secured to the first arm 22 by, for example, mechanical fasteners, welds or adhesives. The first clip bracket 42 is configured and dimensioned to create an opening 44 between a portion of the first clip bracket and the first arm 22. In this exemplary embodiment, the first clip bracket 42 is an L-shape bracket where the short leg 46 of the first clip bracket 42 has one end that is integrally or monolithically formed into the first arm 22. The height "H1" of the short leg 46 should be sufficient to permit a portion of a structure 110, e.g., a flange 112 of the structure 110 seen in FIG. 9, to fit into the opening 44 of the first clip pocket 40. For example, if a thickness "T" of the flange 112 of the structure 110 is 1.5 mm, the height "H1" of the short leg 46 would be about 2.5 mm. The length "D1" of the long leg 48 of the first clip bracket 42 should be sufficient to permit a portion of the structure 110, e.g., the flange 112 of the structure seen in FIG. 9, to enter at least partially into the opening 44 in the first clip pocket 40. For example, if a length "E" of the flange 112 of the structure 110 is 12 mm, the length "D1" of the long leg 48 would be at least about 6 mm.

Referring to FIG. 4, the second clip pocket 60 is formed by a second clip bracket 62 that may be integrally or monolithically formed into the second arm 24, or secured to the second arm 24 by, for example, mechanical fasteners, welds or adhesives. The second clip bracket 62 is configured and dimensioned to create an opening 64 between a portion of the second clip bracket 62 and the second arm 24. In this exemplary embodiment, the second clip bracket 62 is an L-shape bracket where the short leg 66 of the second clip bracket 62 has one end that is integrally or monolithically formed into the second arm 24. The height "H2" of the short leg 66 should be sufficient to permit a portion of the structure 110, e.g., the flange 112 of the structure 110 seen in FIG. 11, to fit into the opening 64 of the second clip pocket 60. For example, if a thickness "T" of the flange 112 of the structure 110 is 1.5 mm, the height "H2" of the short leg 46 would be about 2.5 mm. It is noted that the height "H1" and "H2" may be the same or they may be different such that one height may accommodate one structure thickness and the other height may accommodate another structure thickness. The length "D2" of the long leg 68 of the second clip bracket 62 should be sufficient to permit a portion of the structure 110, e.g., the flange 112 of the structure seen in FIG. 11, to enter at least partially into the opening 64 in the second clip pocket 60. For example, if a length "E" of the flange 112 of the structure 110 is 12 mm, the length "D2" of the long leg 68 would be about at least 6 mm. It is noted that the length "D1" and "D2" may be the same or they may be different such that one length may accommodate one structure length and the other length may accommodate another structure length.

Referring to FIGS. 1, 5, 7 and 8, to help facilitate a tighter grip between the first clip pocket 40 and, for example, the flange 112 of the structure 110, the first arm 22 may include one or more structure engaging members 70 that extend away from the first arm 22 in a direction toward a plane associated with the long leg 48 of the first clip bracket 42. The one or more structure engaging members 70 may be provided to improve the grip between the first clip pocket 40 and a portion of the structure, e.g., structure 110, to which the wire management clip 10 is to be attached. The structure engaging members 70 may be one or more teeth or pointed edges, one or more tabs or ribs, one or more raised surfaces or other structures that can engage and grip the structure, e.g., structure 110 seen in FIG. 9, or that can engage the structure and create a friction force or a friction fit between the wire management clip 10 and the portion of the structure to which the wire management clip is attached.

Referring to FIGS. 2, 6, 7 and 8, to help facilitate a tighter grip between the second clip pocket 60 and, for example, the flange 112 of the structure 110, the second arm 24 may include one or more structure engaging members 72 that extend away from the second arm 24 in a direction toward a plane associated with the long leg 68 of the second clip bracket 62. The one or more structure engaging members 72 may be provided to improve the grip between the second clip pocket 60 and a portion of the structure, e.g., structure 110, to which the wire management clip 10 is to be attached. The structure engaging members 72 may be one or more teeth or pointed edges, one or more tabs or ribs, one or more raised surfaces or other structures that can engage and grip the structure, e.g., structure 110 seen in FIG. 9, or that can engage the structure and create a friction force or a friction fit between the wire management clip 10 and the portion of the structure to which the wire management clip is attached.

Referring again to FIGS. 3 and 4, the clip pockets 40 and 60 are oriented on their respective arms 22 or 24 to allow the clip 10 to be attached to a structure, e.g., structure 110, in different positions where the opening of the clip pocket is accessible from different sides or ends of the clip 10. For example, the first clip pocket 40 may be oriented relative to the first arm 22 so that the opening 44 is accessible from the base 26 end of the clip 10, as shown. With the first clip pocket 40 accessible from the base 26 end of the clip 10, the second clip pocket 60 may be oriented relative to the second arm 24 so that the opening 64 is accessible from the lead-in end of the clip 10, as shown. In another exemplary embodiment, the first clip pocket 40 may be oriented relative to the first arm 22 so that the opening 44 is accessible from a left or right side of the clip 10. With the first clip pocket 40 accessible from a left or right side of the clip 10, the second clip pocket 60 may be oriented relative to the second arm 24 so that the opening 64 is accessible from the right or left side of the clip 10 respectfully.

Figure 9:
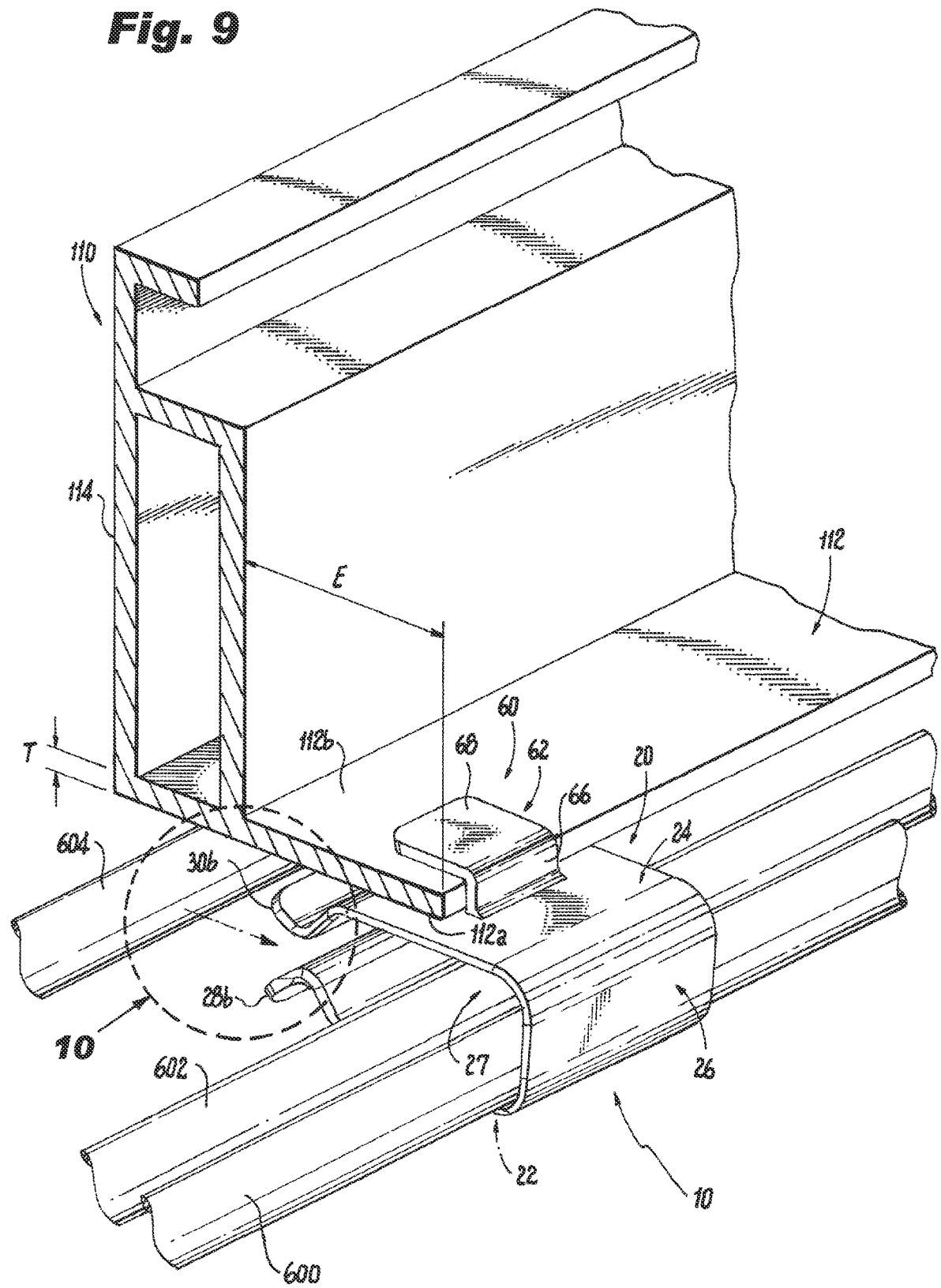
FIG. 9 is a bottom perspective view of the wire management clip of FIG. 1 attached to a bottom side of a flange of a frame of a photovoltaic module in a first position, illustrating multiple cables received in and held by the wire management clip.
Figure 10:
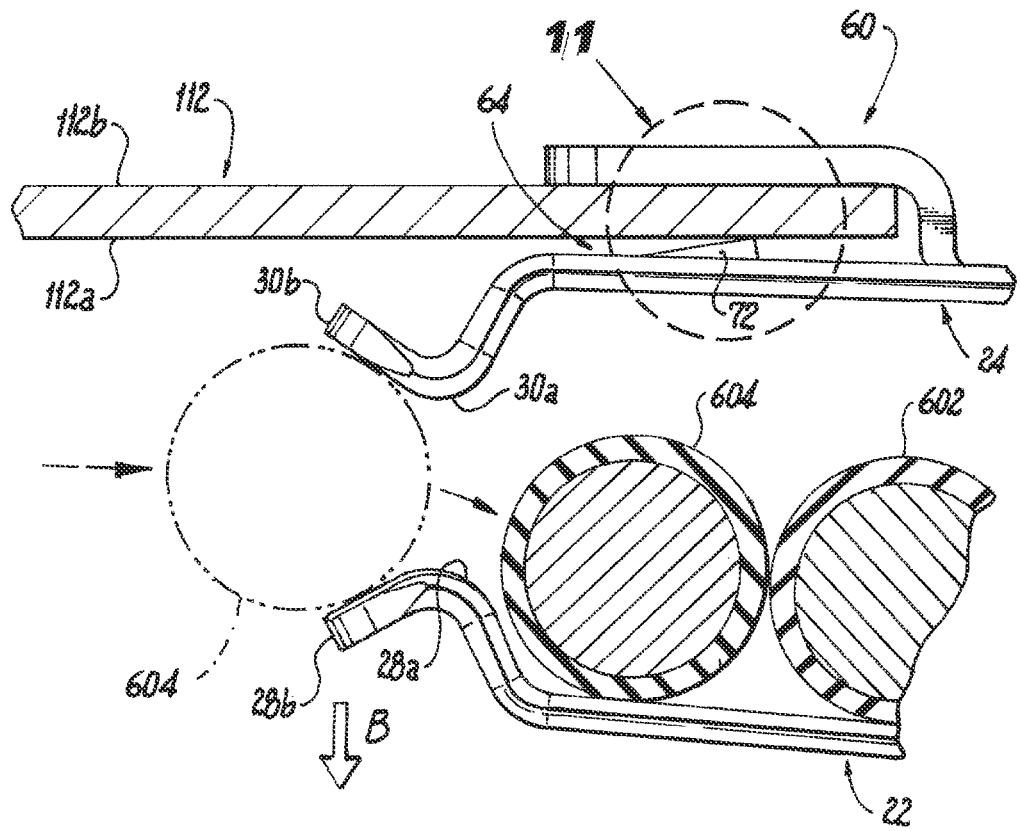
FIG. 10 is a side elevation view of a portion of the wire management clip and frame of FIG. 9 taken from detail 10, illustrating lead-ins of the wire management clip separated to receive a cable in a cable pocket of the wire management clip.
Figure 11:
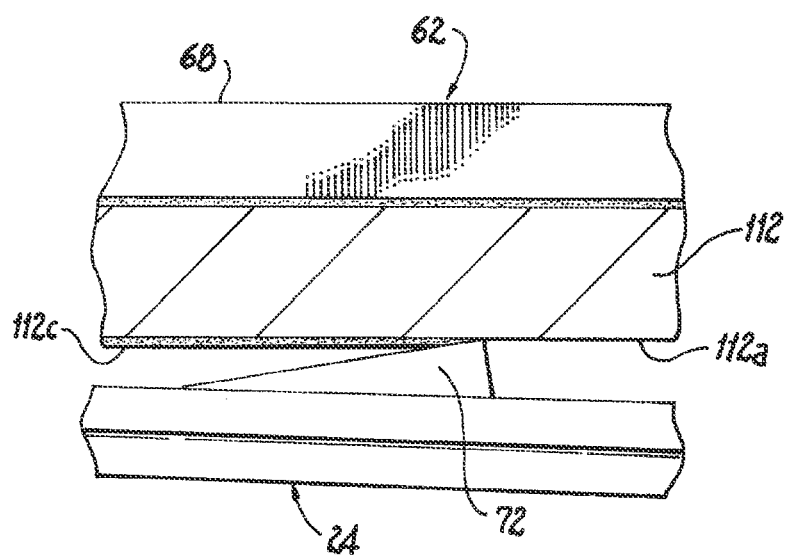
FIG. 11 is a side elevation view of a portion of the wire management clip and frame of FIG. 10 taken from detail 11, illustrating a structure engaging member piercing through a non-conductive coating on the frame and engaging the metal structure of the frame.

As set forth above, the clip pockets 40 and 60 are oriented so that the clip 10 can be attached to a structure in different positions. As shown in FIG. 9, the clip 10 is attached to the flange 112 of the structure 110 so that the clip is below the flange and the lead-ins 28 and 30 are facing in a direction toward a back wall 114 of the structure 110. To attach the clip 10 to the flange 112, the opening 64 of the clip pocket 60 is aligned with the flange and force is applied to, for example, the base 26 of the clip pocket 20 in the direction of the back wall 114. As the clip pocket 60 is pressed onto the flange 112, the structure engaging members 72 engage the bottom surface 112a of the flange and grasps the flange to attach the clip 10 to the flange. In the exemplary embodiment of the clip 10 of FIG. 1, the structure engaging members 72 have a pointed tip that may pierce any non-conductive coatings on the flange 112 so that the clip 10 may be electrically bonded to the structure 110, as seen in FIG. 11. With the clip 10 attached to the flange 112, cables 600, 602 and 604 can be inserted into the opening 27 of the cable pocket 20. When inserting the cables, e.g., cable 604, into the opening 27, the cable contacts the flared member 28b of the lead-in 28 and the flared member 30b of the lead-in 30 and rides along the flared members 28b and 30b causing the first arm 22 to flex in the direction of arrow "B" so that gap "G" increases sufficient to permit the cable 604 to pass into the opening 27, as seen in FIG. 10. Once the cable passes the curved member 28a and the curved member 30a of the respective lead-ins 28 and 30, the force applied to the lead-ins 28 and 30 is removed allowing the first arm 22 to return to its normal state. At this point the gap "G" decreases to its normal state holding the cables 600, 602 and 604 within the opening 27 of the cable pocket 20.

Figure 12:
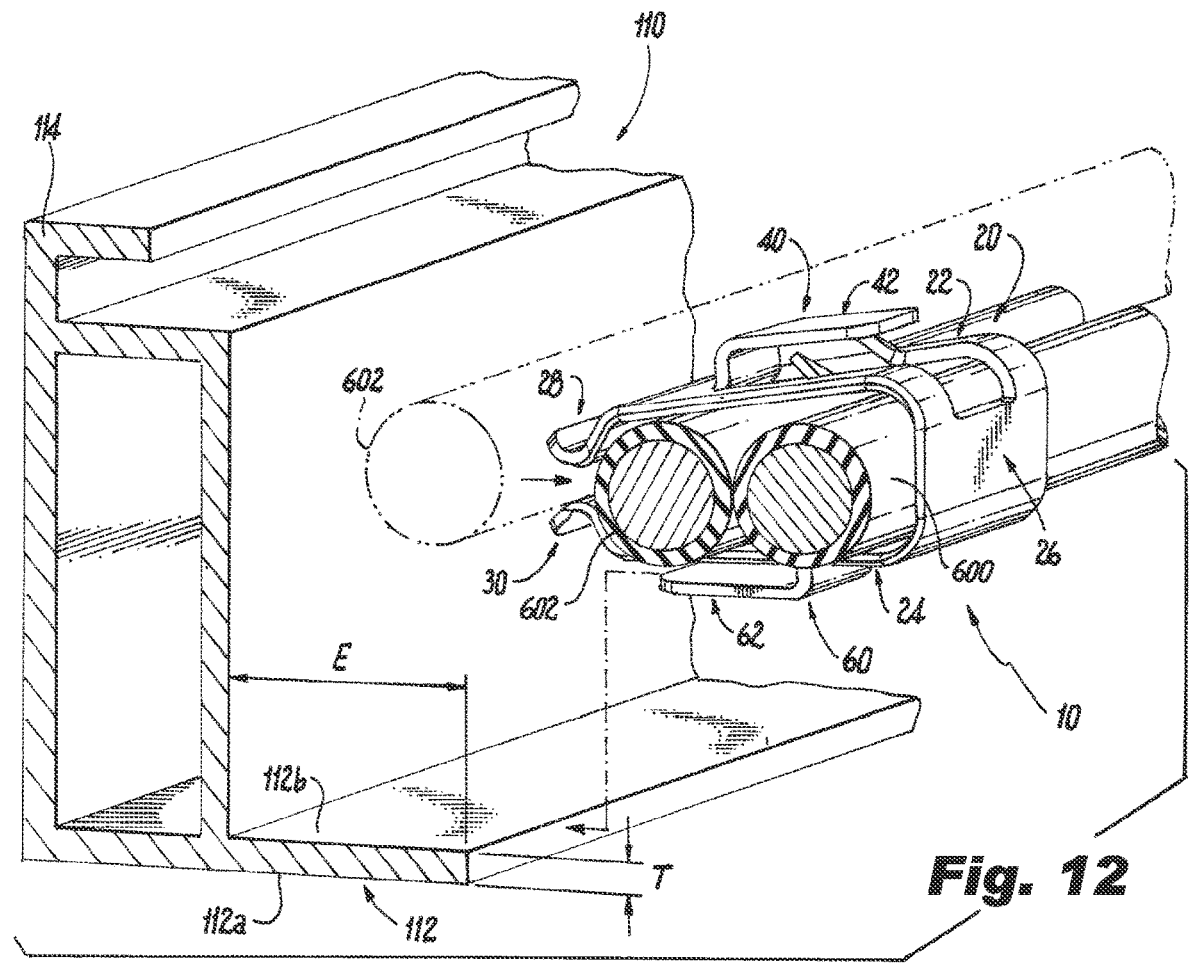
FIG. 12 is a perspective view of the wire management clip and frame of FIG. 9 with parts separated, illustrating multiple cables being inserted into the wire management clip prior to attaching the wire management clip to a top side of the flange of the photovoltaic module frame.
Figure 13:
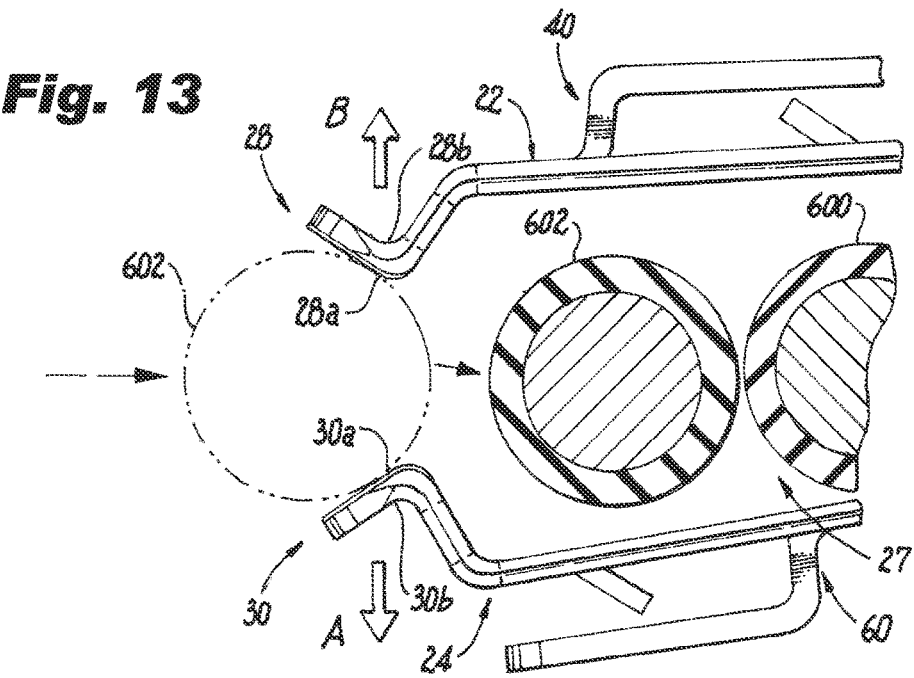
FIG. 13 is a side elevation view of a portion of the wire management clip of FIG. 12, illustrating lead-ins of the wire management clip separated to receive a cable in a cable pocket of the wire management clip.

As shown in FIG. 12, the clip 10 is attached to the flange 112 of the structure 110 so that the clip is above the flange and the lead-ins 28 and 30 are facing toward the back wall 114 of the structure 110. In this exemplary embodiment, the cables 600 and 602 are first inserted into the opening 27 of the cable pocket 20. When inserting the cables, e.g., cable 602, into the opening 27, the cable contacts the flared member 28b of the lead-in 28 and the flared member 30b of the lead-in 30 and rides along the flared members 28b and 30b causing the first arm 22 to flex in the direction of arrow "B" and the second arm 24 to flex in the direction of arrow "A" so that gap "G" increases sufficient to permit the cable to pass into the opening 27, as seen in FIG. 13. Once the cable passes the curved member 28a and the curved member 30a of the respective lead-ins 28 and 30, the force applied to the lead-ins 28 and 30 is removed allowing the first arm 22 and the second arm 24 to return to their normal state. At this point the gap "G" decreases to its normal state holding the cables 600 and 602 within the opening 27 of the cable pocket 20. With the cables in the cable pocket 20, the clip 10 can then be attached to the flange 112. To attach the clip 10 to the flange 112, the opening 64 of the second clip pocket 60 is aligned with the flange 112 and force is applied to, for example, the base 26 of the clip pocket 20 in a direction toward the back wall 114. As the clip pocket 60 is pressed onto the flange 112, the structure engaging members 72 engage the bottom surface 112a of the flange 112 and grasp the flange to attach the clip 10 to the flange 112. In the exemplary embodiment of the clip 10 of FIG. 1, the structure engaging members 72 have a pointed tip that may pierce any non-conductive coatings on the flange 112 so that the clip 10 may be electrically bonded to the structure 110.

Figure 14:
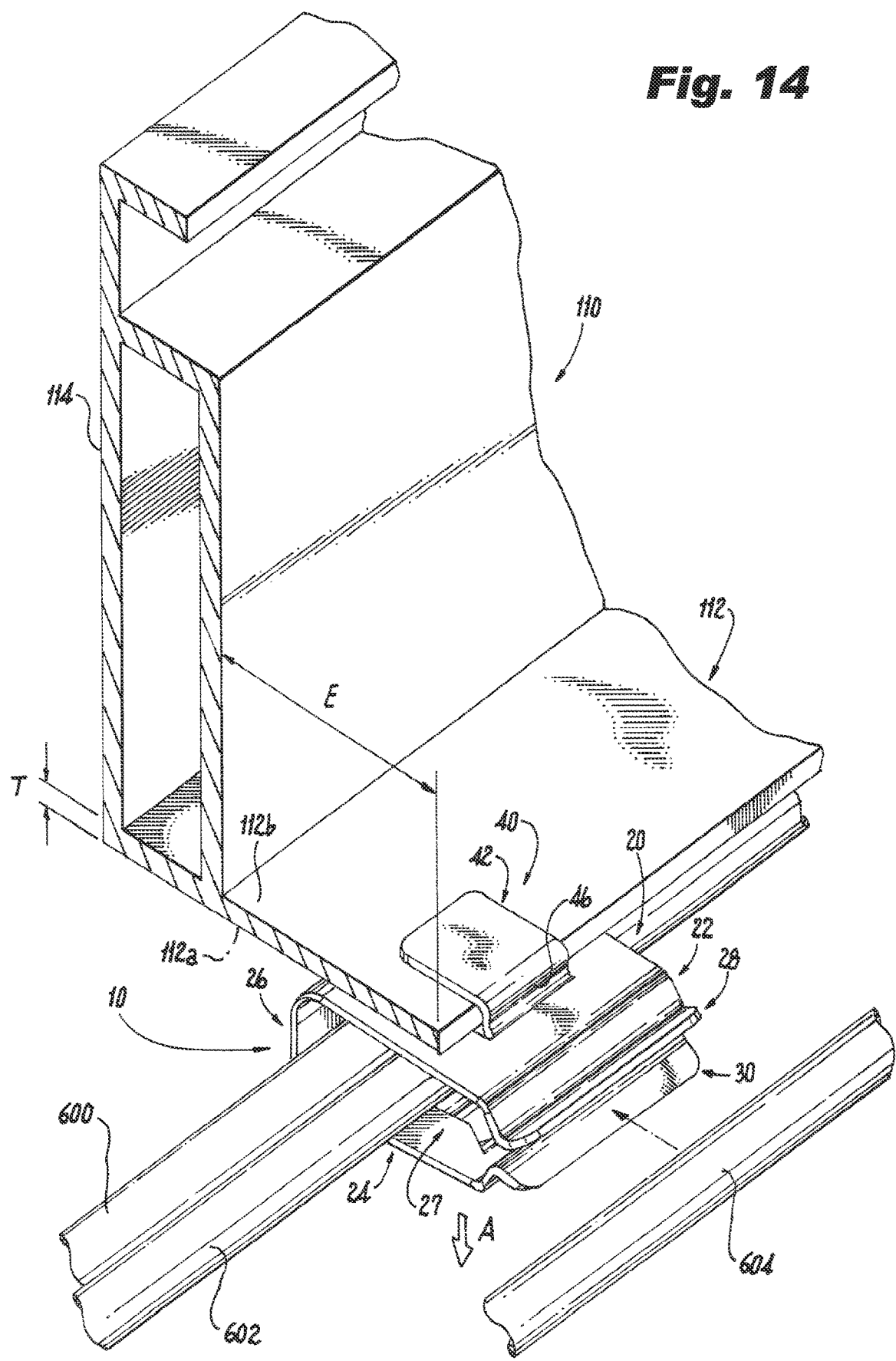
FIG. 14 is a perspective view of the wire management clip of FIG. 1 attached to a bottom side of a flange of a frame of a photovoltaic module in a second position, illustrating multiple cables received in and held by the wire management clip.

As shown in FIG. 14, the clip 10 may be attached to a structure in different position. As shown, the clip 10 can be attached to the flange 112 of the structure 110 so that the clip is below the flange and the lead-ins 28 and 30 are facing in a direction away from the back wall 114 of the structure 110. To attach the clip 10 to the flange 112, the opening 44 of the clip pocket 40 is aligned with the flange and force is applied to, for example, the lead-ins 28 and 30 of the clip pocket 20 in a direction toward the back wall 114. As the clip pocket 40 is pressed onto the flange 112, the structure engaging members 70 engage the bottom surface 112a of the flange 112 and grasps the flange to attach the clip 10 to the flange. In the exemplary embodiment of the clip 10 of FIG. 1, the structure engaging members 70 have a pointed tip that may pierce any non-conductive coatings on the flange 112 so that the clip 10 may be electrically bonded to the structure 110. With the clip 10 attached to the flange 112, cables 600, 602 and 604 can be inserted into the opening 27 of the cable pocket 20. When inserting the cables, e.g., cable 604, into the opening 27 the cable contacts the flared member 28b of the lead-in 28 and the flared member 30b of the lead-in 30 and rides along the flared members 28b and 30b causing the second arm 24 to flex in the direction of arrow "A" so that gap "G" increases sufficient to permit the cable 604 to pass into the opening 27. Once the cable passes the curved member 28a and the curved member 30a of the respective lead-ins 28 and 30, the force applied to the lead-ins 28 and 30 is removed allowing the second arm 24 to return to its normal state. At this point the gap "G" decreases to its normal state holding the cables 600 and 602 within the opening 27 of the cable pocket 20.

Figure 15:
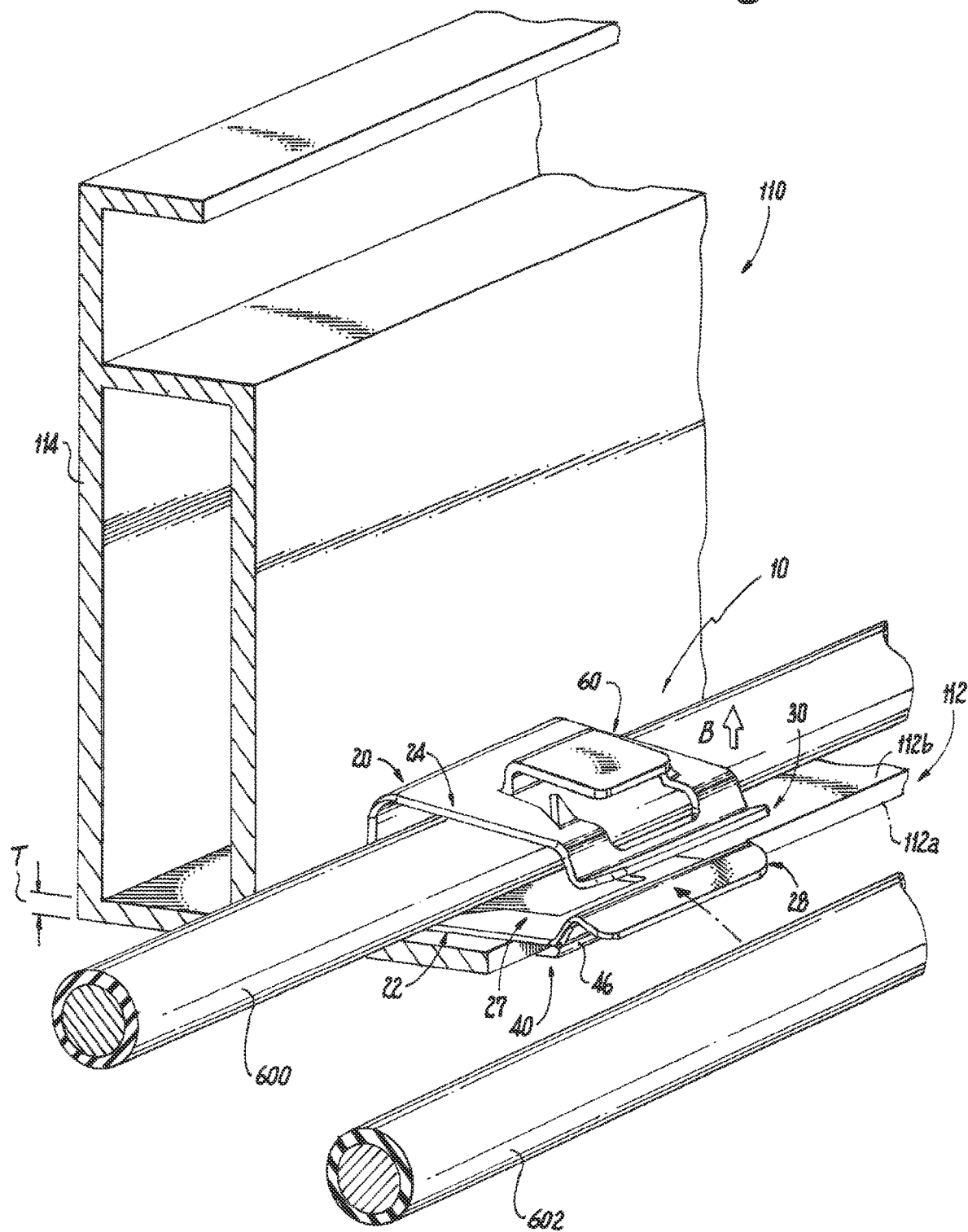
FIG. 15 is a top perspective view of the wire management clip of FIG. 1 attached to a top side of a flange of a frame of a photovoltaic module in a second position, illustrating multiple cables received in and held by the wire management clip.
Figure 16:
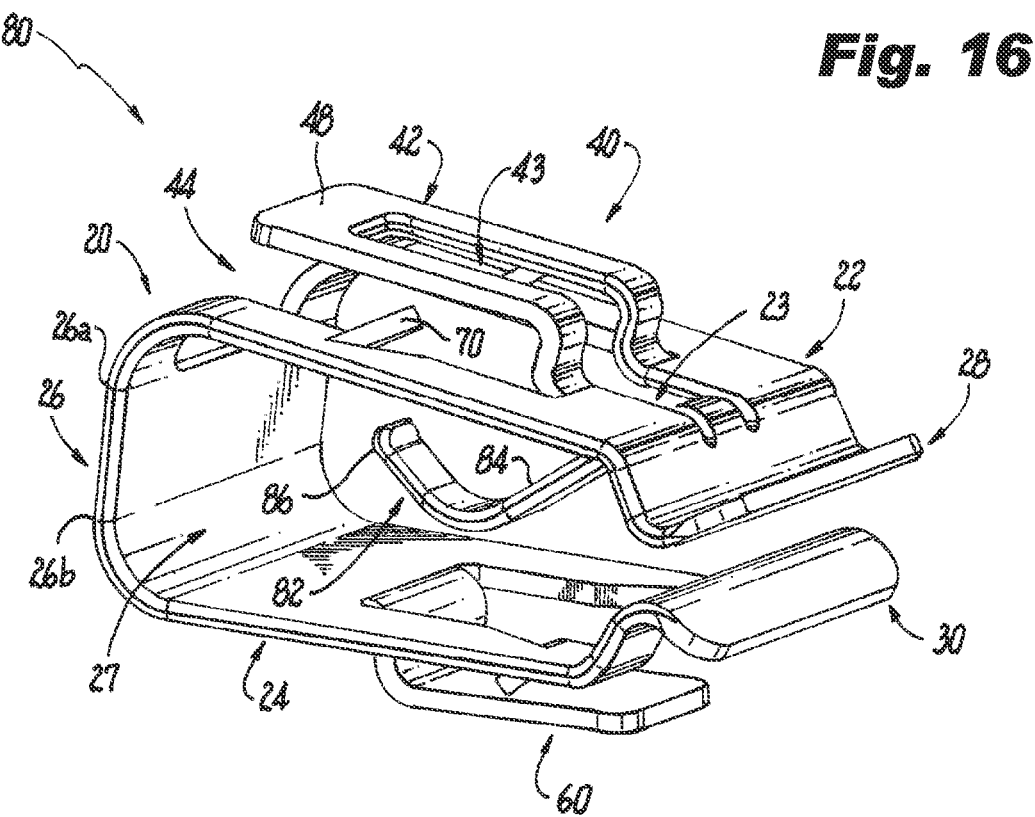
FIG. 16 is a perspective view of a top side of another exemplary embodiment of a wire management clip according to the present disclosure, illustrating a cable arm extending into a cable pocket of the wire management clip.
Figure 17:
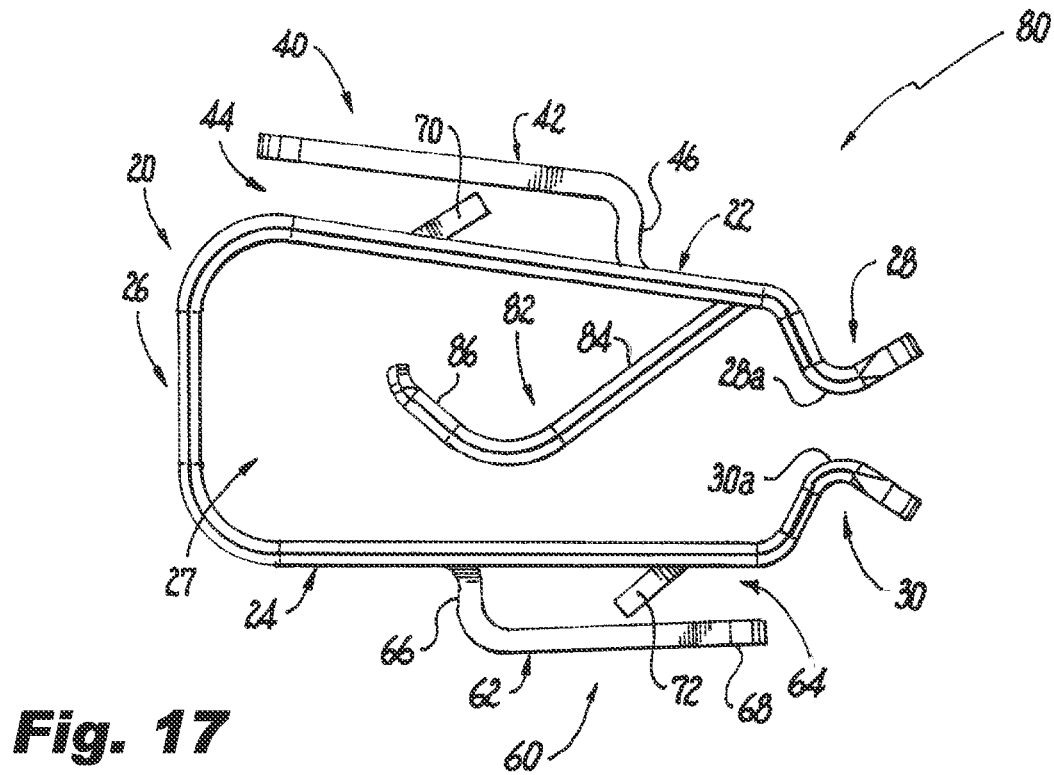
FIG. 17 is a side elevation view of a first side of the wire management clip of FIG. 16.
Figure 18:
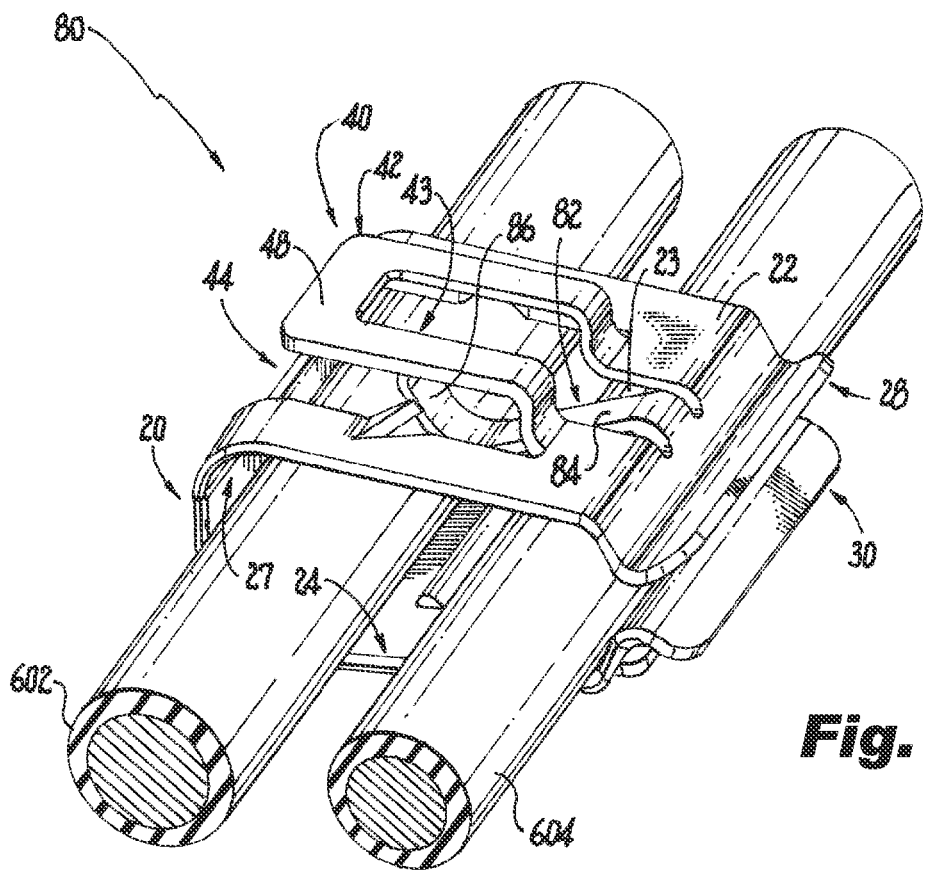
FIG. 18 is a perspective view of the top side of the wire management clip of FIG. 16, illustrating multiple cables held within the cable pocket.
Figure 19:
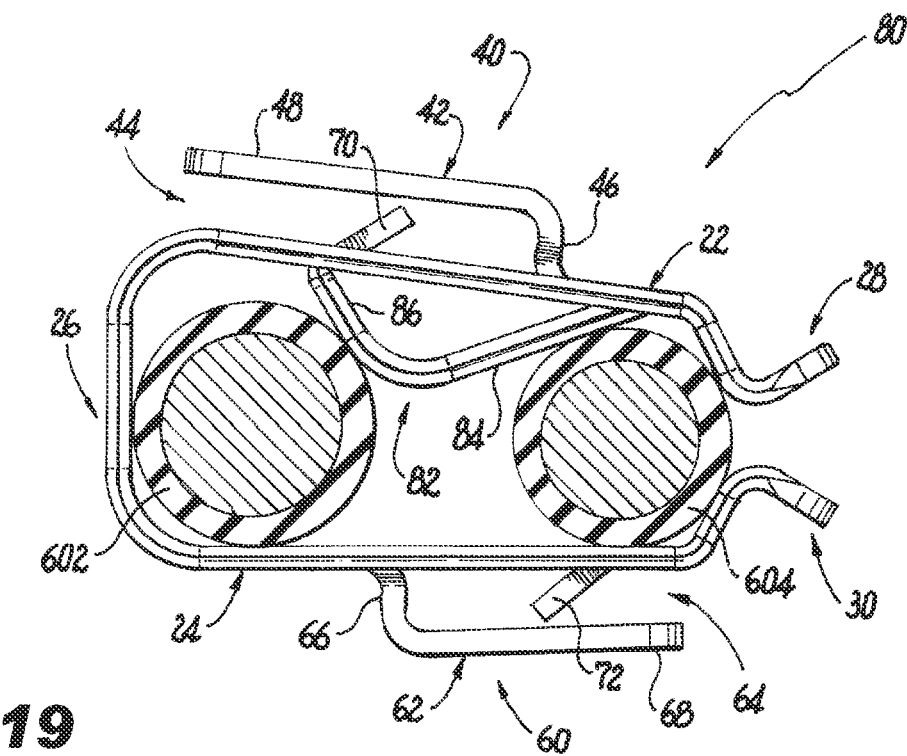
FIG. 19 is a side elevation view of the wire management clip of FIG. 18.

As shown in FIG. 15, the clip 10 is attached to the flange 112 of the structure 110 so that the clip is above the flange and the lead-ins 28 and 30 are facing in a direction away from the back wall 114 of the structure 110. To attach the clip 10 to the flange 112, the opening 44 of the clip pocket 40 is aligned with the flange and force is applied to, for example, the lead-ins 28 and 30 of the clip pocket 20 in a direction toward the back wall 114. As the clip pocket 40 is pressed onto the flange 112, the structure engaging members 70 engage the top surface 112b of the flange 112 and grasps the flange to attach the clip 10 to the flange. In the exemplary embodiment of the clip 10 of FIG. 1, the structure engaging members 70 have a pointed tip that may pierce any non-conductive coatings on the flange 112 so that the clip 10 may be electrically bonded to the structure 110. With the clip 10 attached to the flange 112, cables 600 and 602 can be inserted into the opening 27 of the cable pocket 20. When inserting the cables, e.g., cable 602, into the opening 27, the cable contacts the flared member 28b of the lead-in 28 and the flared member 30b of the lead-in 30 and rides along the flared members 28b and 30b causing the second arm 24 to flex in the direction of arrow "B" so that gap "G" increases sufficient to permit the cable to pass into the opening 27. Once the cable passes the curved member 28a and the curved member 30a of the respective lead-ins 28 and 30, the force applied to the lead-ins 28 and 30 is removed allowing the second arm 24 to return to its normal state. At this point the gap "G" decreases to its normal state holding the cables 600 and 602 within the opening 27 of the cable pocket 20.

Referring to FIGS. 16-19, another exemplary embodiment of a wire management clip according to the present disclosure is shown. In this exemplary embodiment, the clip 80 is substantially the same as clip 10 described so that the same reference numerals are used for the same elements, and for ease of description the same elements will not be described again. In this exemplary embodiment, the clip 80 includes a cable arm 82 extending from the first arm 22 into the opening 27 of the cable pocket 20 and a slot 23 in the first arm 22 and a slot 43 in the first clip bracket 42 through which the cable arm 82 can pass. The cable arm 82 is provided to help retain the cable or cables, e.g., cables 602 and 604, within the opening 27 of the cable pocket 20, as seen in FIGS., 18 and 19. More specifically, the cable arm 82 has a spring like function in that the cable arm 82 extends into the opening 27 in a normal state and can flex toward the first arm 22 when cables are inserted into the opening 27 of the cable pocket 20 and spring back toward the normal state once the cable passes the lead-ins 28 and 30. The cable arm 82 has a first leg 84 with one end integrally or monolithically formed into the first arm 22 or secured to the first arm 22 by, for example, mechanical fasteners, welds or adhesives. The first leg 84 is formed into or secured to the first arm 22 at an angle relative to the long axis of the first arm 22 so that the first leg 84 is within the into the opening 27. The cable arm 82 also includes a second leg 86 has one end that is formed into or secured to a second end of the first leg 84 and a free end, as shown. The second leg 86 may be a curved or rounded structure that distances the free end of the second leg 86 away from contacting the cables within the opening 27 of the cable pocket 20.

Figure 20:
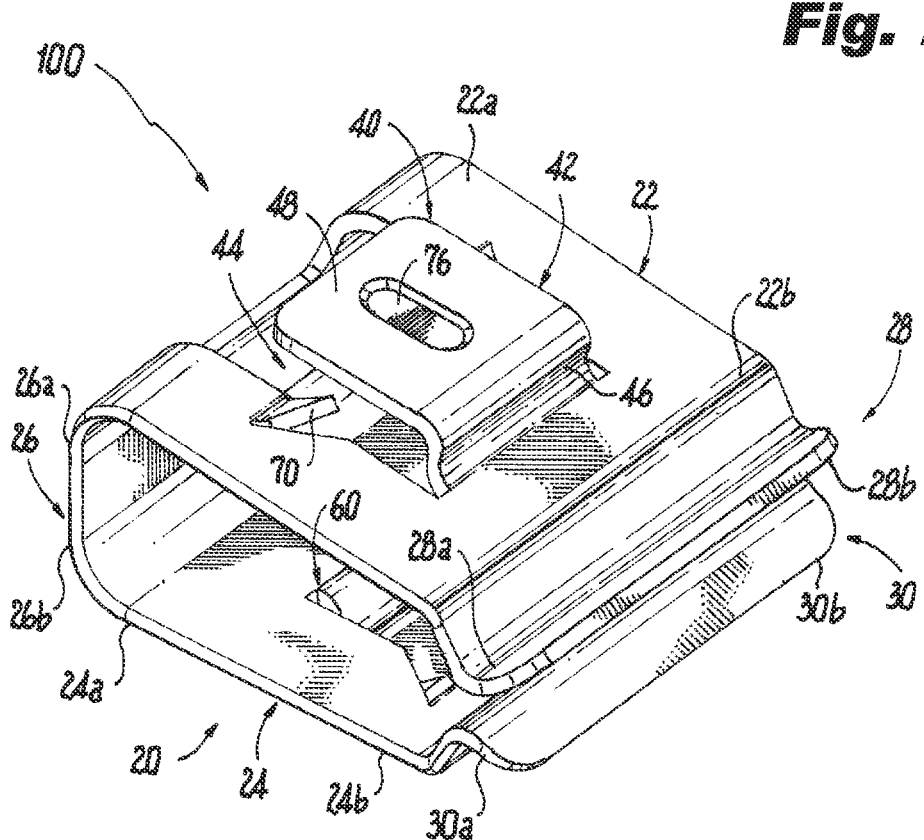
FIG. 20 is a perspective view of a top side of another exemplary embodiment of a wire management clip according to the present disclosure.
Figure 21:
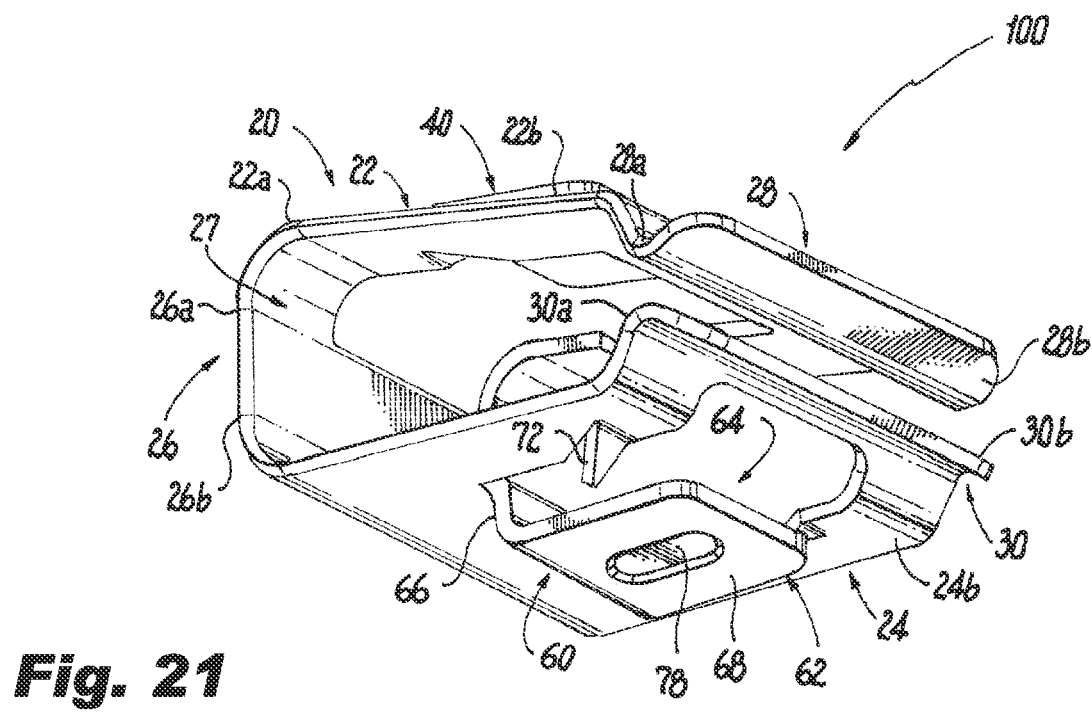
FIG. 21 is a perspective view of a bottom side of the wire management clip of FIG. 20.
Figure 22:
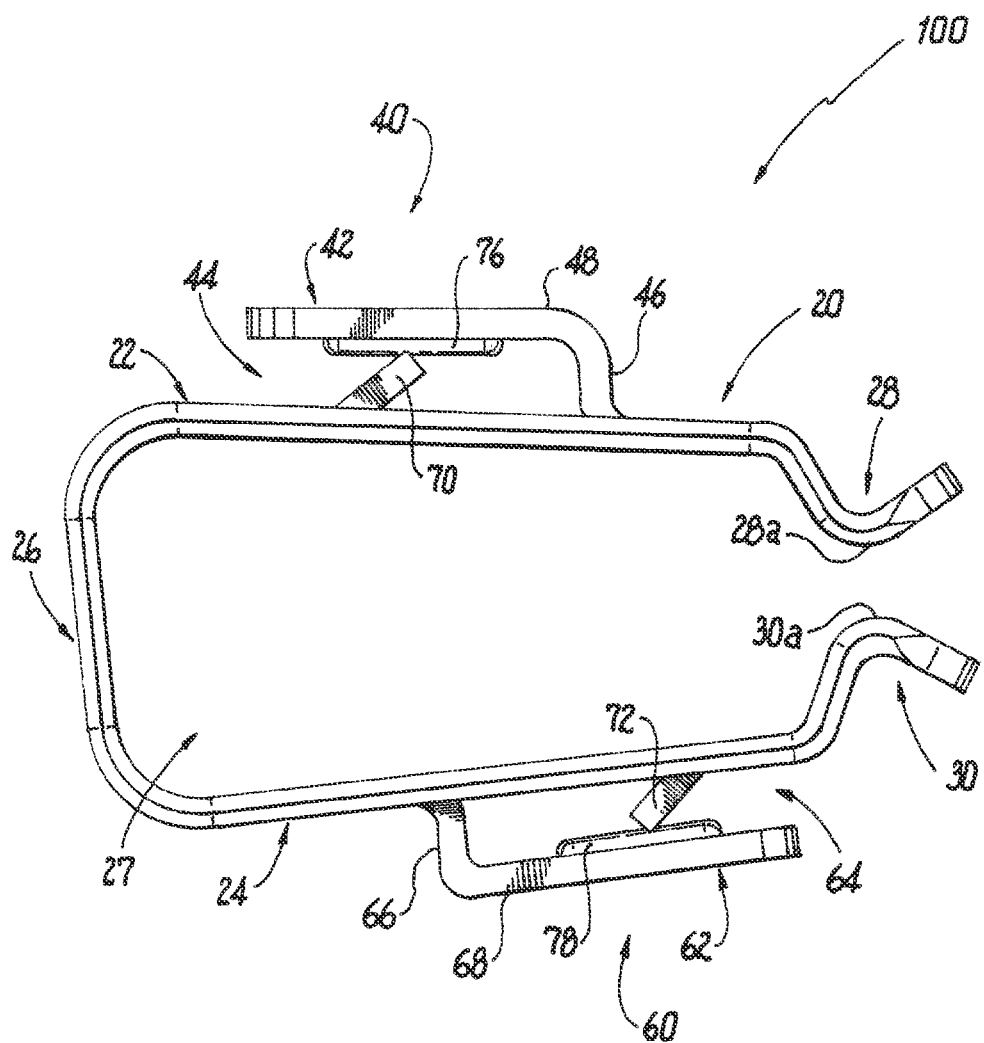
FIG. 22 is a side elevation view of the wire management clip of FIG. 20.

Turning now to FIGS. 20-22, another exemplary embodiment of a wire management clip according to the present disclosure is shown. The clip 100 includes one or more cable pockets and one or more clip pockets. In this exemplary embodiment there is a single cable pocket 20 and two clip pockets; a first clip pocket 40 and a second clip pocket 60. The cable pocket 20 is the same as the cable pocket described above and for ease of description is not repeated. The first clip pocket 40 is substantially the same as the first clip pocket described above, except that the long leg 48 of the first clip bracket 42 includes one or more second structure engaging members 76. In this exemplary embodiment, the one or more second structure engaging members 76 may be one or more raised surfaces extending from the long leg 48 of the first clip bracket 42 into the opening 44 of the first clip pocket 40. Similarly, the second clip pocket 60 is substantially the same as the second clip pocket described above, except that the long leg 68 of the second clip bracket 62 includes one or more second structure engaging members 78. In this exemplary embodiment, the one or more second structure engaging members 78 may be one or more raised surfaces extending from the long leg 68 of the second clip bracket 68 into the opening 64 of the second clip pocket 60. The second structure engaging members 76 and 78 may be provided to further enhance the attachment of the clip 100 to the structure, e.g., structure 110, by increasing the friction force or a friction fit between first and second clip brackets 40 and 60 and the structure. It is noted that the second structure engaging members 76 and 78 may include knurling or other surface roughing to further increase the friction force between first and second clip brackets 40 and 60 and the structure. It is also noted that the second structure engaging members 76 and 78 may be one or more teeth or pointed edges, one or more tabs or ribs, one or more raised surfaces or other structures that can engage and grip the structure, or that can engage the structure and create a friction force or a friction fit between the wire management clip 100 and the portion of the structure to which the wire management clip is attached.

Figure 23:
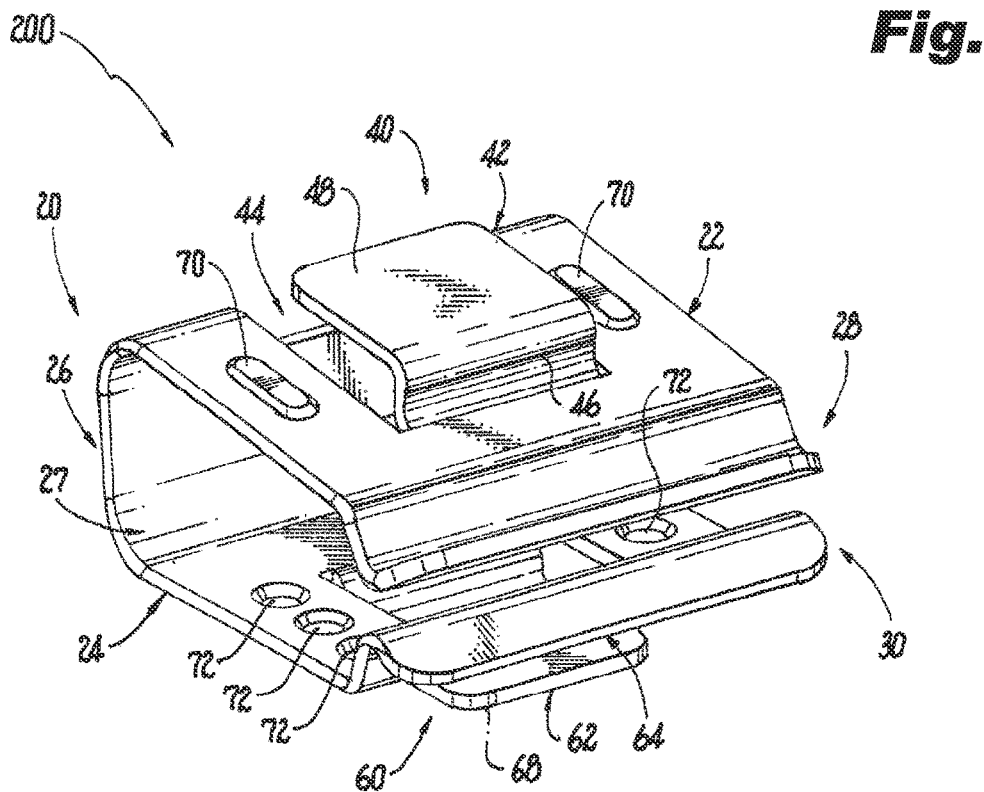
FIG. 23 is a perspective view of a top side of another exemplary embodiment of a wire management clip according to the present disclosure.
Figure 24:
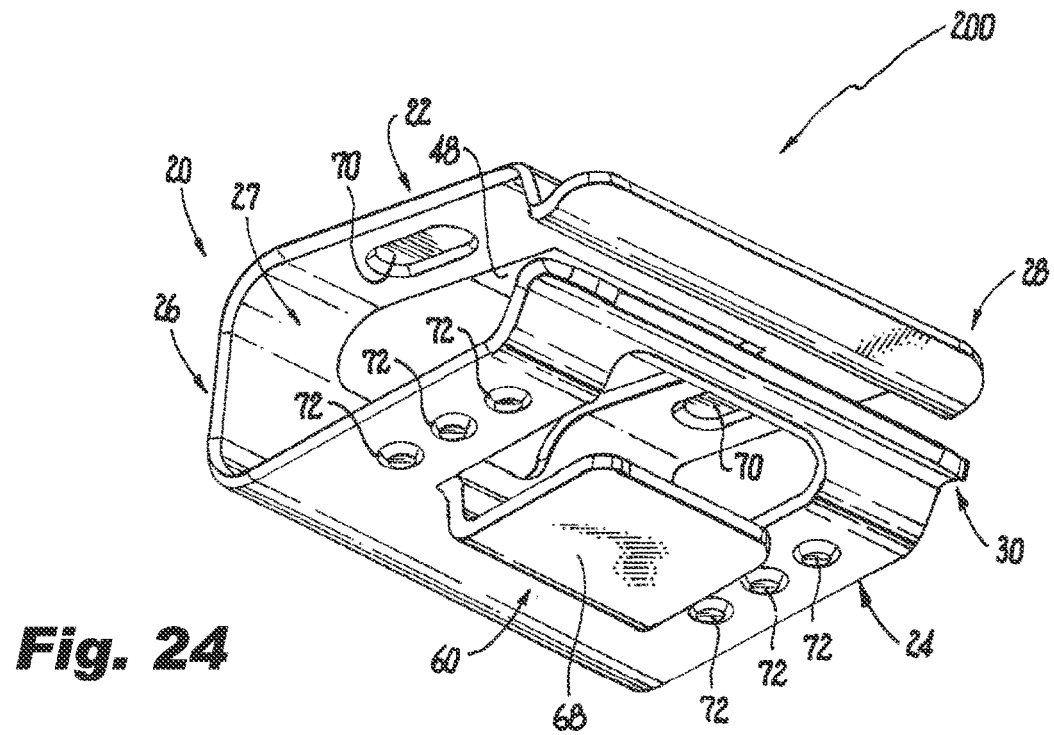
FIG. 24 is a perspective view of a bottom side of the wire management clip of FIG. 23.
Figure 25:
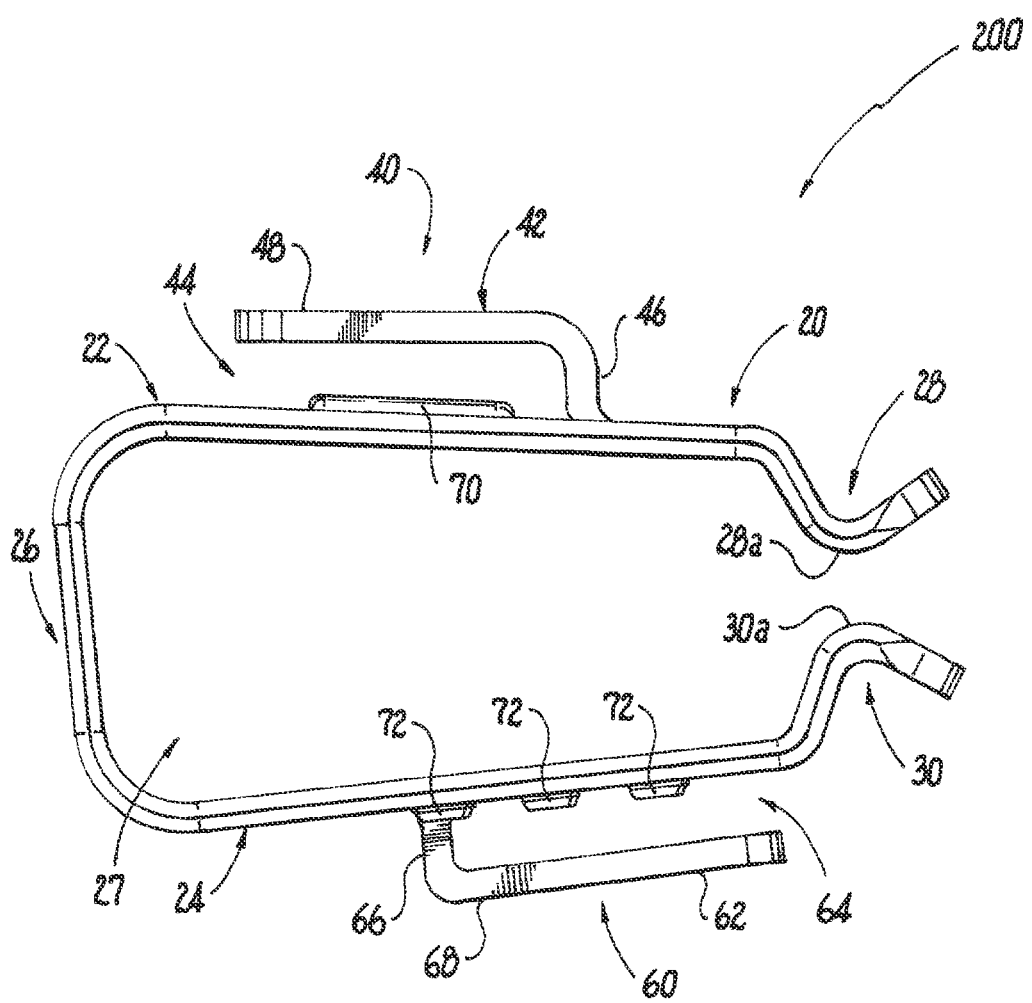
FIG. 25 is a side elevation view of the wire management clip of FIG. 23.

Turning now to FIGS. 23-25, another exemplary embodiment of a wire management clip according to the present disclosure is shown. The clip 200 includes one or more cable pockets and one or more clip pockets. In this exemplary embodiment the first clip pocket 40 and a second clip pocket 60 are the same as the first and second clip pockets described above and for ease of description are not repeated. In this exemplary embodiment there is a single cable pocket 20 that is substantially the same as the cable pocket described above, except the one or more structure engaging members 70 include one or more raised surfaces that extend away from the first arm 22 in a direction toward a plane associated with the long leg 48 of the first clip bracket 42. Similarly, the one or more structure engaging members 72 include one or more raised surfaces that extend away from the second arm 24 in a direction toward a plane associated with the long leg 68 of the second clip bracket 62. In the exemplary embodiment shown, each of the one or more structure engaging members 70 is a single raised surface, and each of the one or more structure engaging members 72 includes a plurality of raised surfaces. However, the present disclosure contemplates that the first arm 22 may include a plurality of raised surfaces instead of a single raised surface, and that the second arm 24 may include a single raised surface instead of plurality of raised surfaces.

Figure 26:
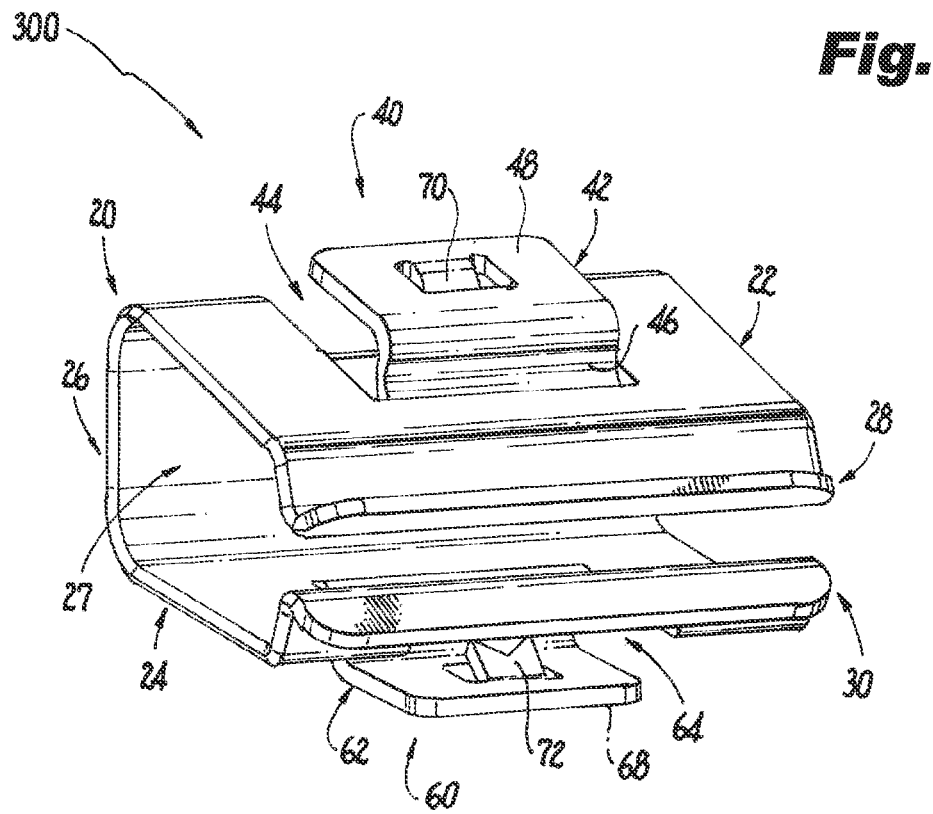
FIG. 26 is a perspective view of a top side of another exemplary embodiment of a wire management clip according to the present disclosure.
Figure 27:
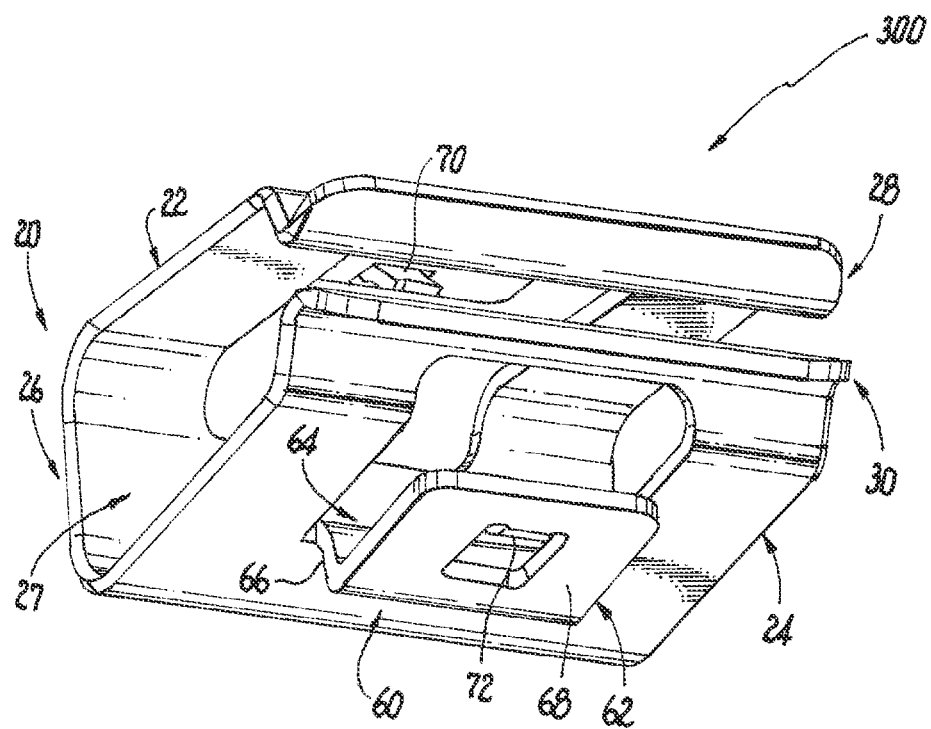
FIG. 27 is a perspective view of a bottom side of the wire management clip of FIG. 26.
Figure 28:
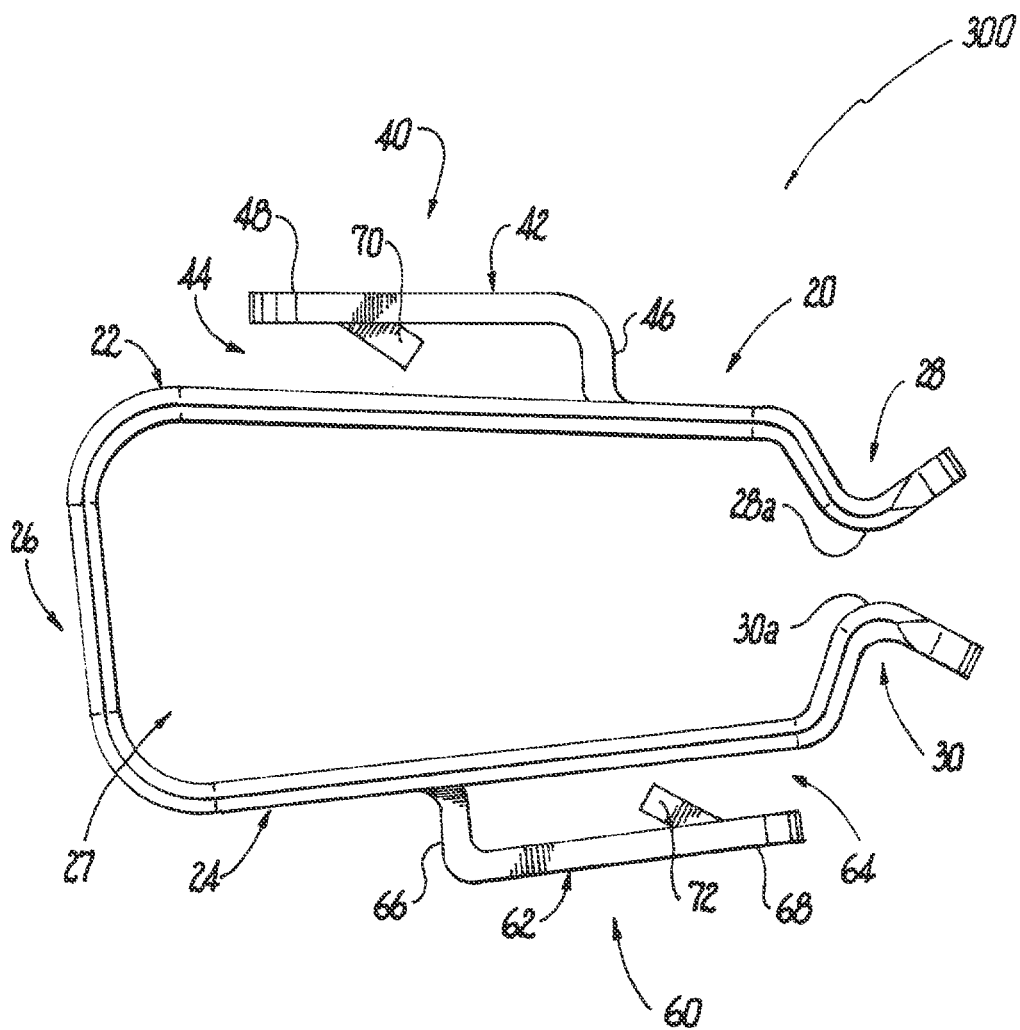
FIG. 28 is a side elevation view of the wire management clip of FIG. 26.

Referring to FIGS. 26-28, another exemplary embodiment of a wire management clip according to the present disclosure is shown. The clip 300 includes one or more cable pockets and one or more clip pockets. In this exemplary embodiment there is a single cable pocket 20 and two clip pockets; a first clip pocket 40 and a second clip pocket 60. The cable pocket 20 is substantially the same as the cable pocket described above, except the first arm 22 does not include one or more structure engaging members 70, and the second arm 24 does not include one or more structure engaging members 72. In this exemplary embodiment, the first clip pocket 40 is substantially the same as the first clip pocket described above, except that the long leg 48 of the first clip bracket 42 includes the one or more structure engaging members 70. The one or more structure engaging members 70 may be provided to improve the grip between the first clip pocket 40 and a portion of the structure, e.g., structure 110, to which the clip 300 is to be attached. The structure engaging members 70 may be one or more teeth or pointed edges, one or more tabs or ribs, one or more raised surfaces or other structures that can engage and grip the structure, or that can engage the structure and create a friction force between the clip 300 and the portion of the structure to which the wire management clip is attached. In this exemplary embodiment, the one or more structure engaging members 70 include two pointed edges extending from the long leg 48 of the first clip bracket 42 into the opening 44 of the first clip pocket 40. Similarly, the second clip pocket 60 is substantially the same as the second clip pocket described above, except that the long leg 68 of the second clip bracket 62 includes the one or more structure engaging members 72. The one or more structure engaging members 72 may be provided to improve the grip between the second clip pocket 60 and a portion of the structure, e.g., structure 110, to which the clip 300 is to be attached. The structure engaging members 72 may be one or more teeth or pointed edges, one or more tabs or ribs, one or more raised surfaces or other structures that can engage and grip the structure, or that can engage the structure and create a friction force or a friction fit between the clip 300 and the portion of the structure to which the wire management clip is attached. In this exemplary embodiment, the one or more structure engaging members 72 include two pointed edges extending from the long leg 68 of the second clip bracket 62 into the opening 64 of the second clip pocket 60.

Figure 29:
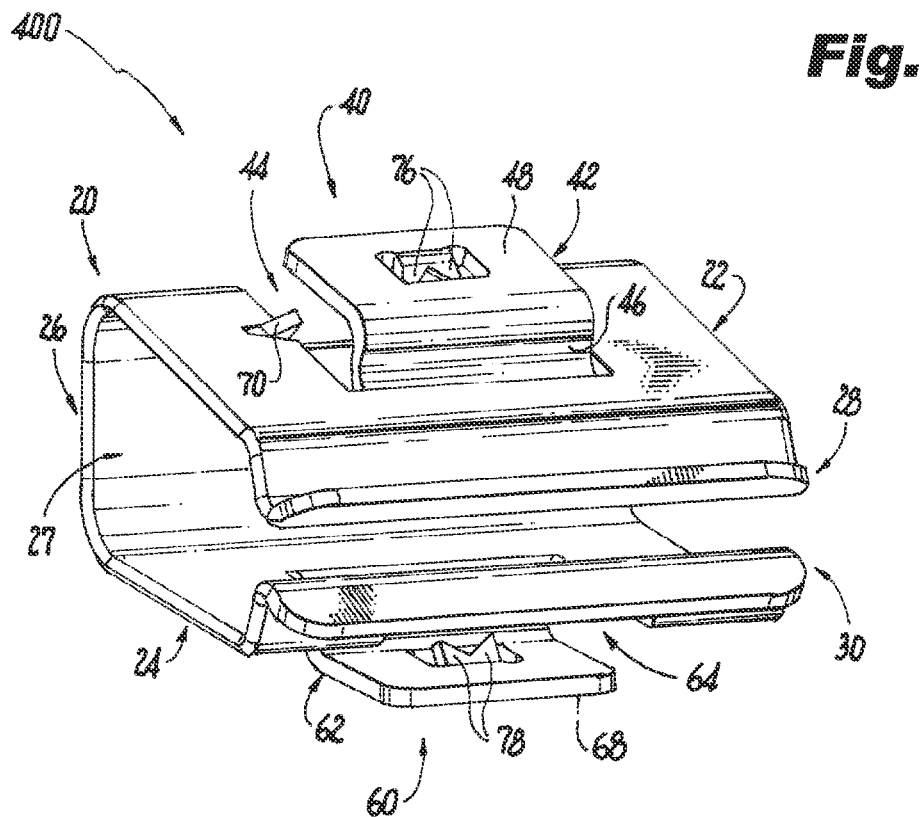
FIG. 29 is a perspective view of a top side of another exemplary embodiment of a wire management clip according to the present disclosure.
Figure 30:
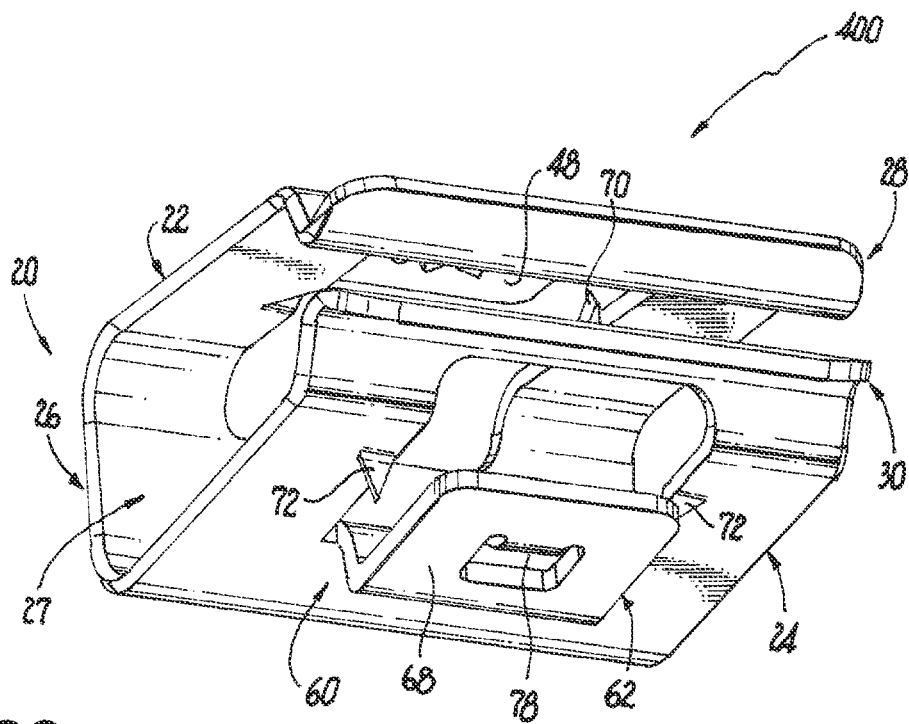
FIG. 30 is a perspective view of a bottom side of the wire management clip of FIG. 29.
Figure 31:
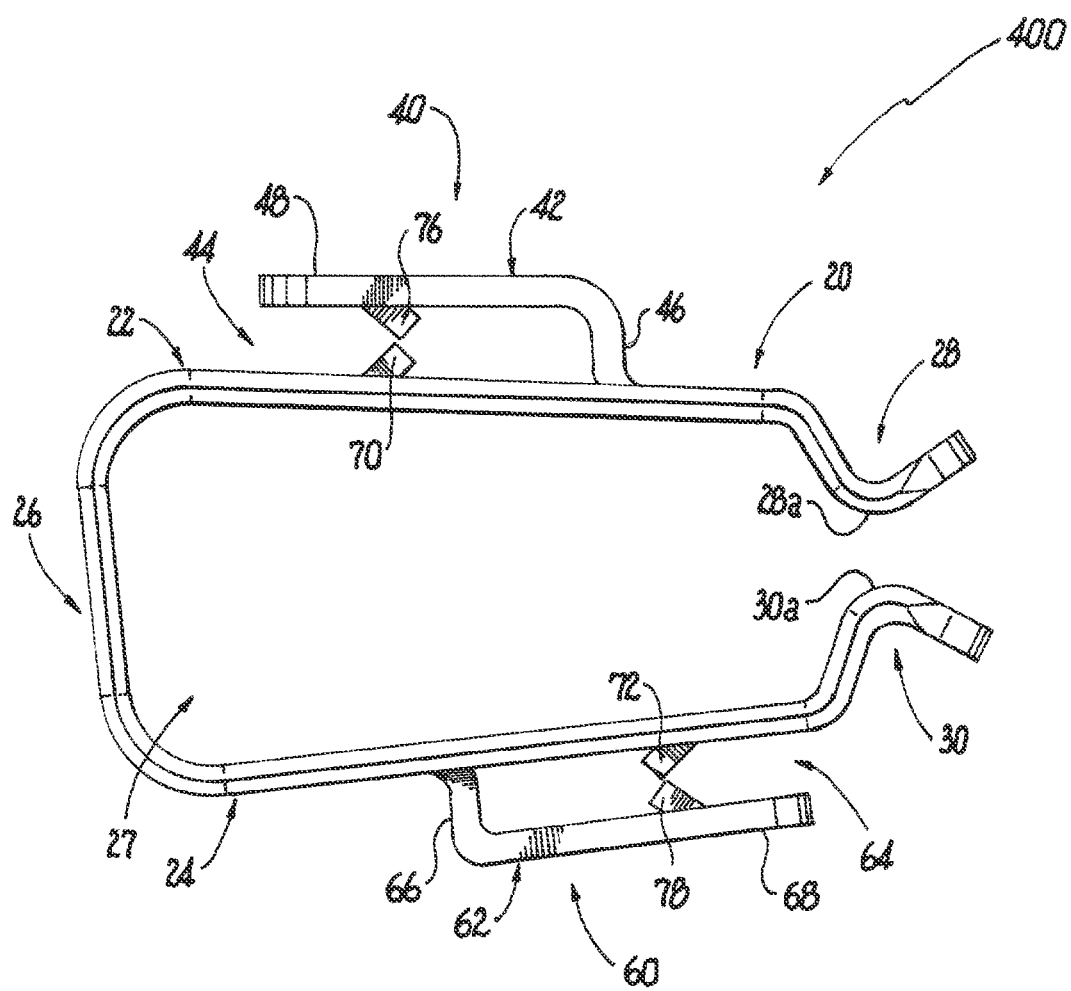
FIG. 31 is a side elevation view of the wire management clip of FIG. 29.

Referring to FIGS. 29-31, another exemplary embodiment of a wire management clip according to the present disclosure is shown. The clip 400 includes one or more cable pockets and one or more clip pockets. In this exemplary embodiment there is a single cable pocket 20 and two clip pockets; a first clip pocket 40 and a second clip pocket 60. The cable pocket 20 is the same as the cable pocket described above and for ease of description is not repeated. The first clip pocket 40 is substantially the same as the first clip pocket described above, except that the long leg 48 of the first clip bracket 42 includes one or more second structure engaging members 76. The one or more second structure engaging members 76 may be provided to further improve the grip between the first clip pocket 40 and a portion of the structure, e.g., structure 110, to which the clip 400 is to be attached. The second structure engaging members 76 may be one or more teeth or pointed edges, one or more tabs or ribs, one or more raised surfaces or other structures that can engage and grip the structure, or that can engage the structure and create a friction force between the clip 400 and the portion of the structure to which the clip is attached. In this exemplary embodiment, the one or more second structure engaging members 76 include two pointed edges extending from the long leg 48 of the first clip bracket 42 into the opening 44 of the first clip pocket 40.

Similarly, the second clip pocket 60 is substantially the same as the second clip pocket described above, except that the long leg 68 of the second clip bracket 62 includes one or more second structure engaging members 78. The one or more second structure engaging members 78 may be provided to further improve the grip between the first clip pocket 40 and a portion of the structure, e.g., structure 110, to which the clip 400 is to be attached. The second structure engaging members 78 may be one or more teeth or pointed edges, one or more tabs or ribs, one or more raised surfaces or other structures that can engage and grip the structure, or that can engage the structure and create a friction force or a friction fit between the clip 400 and the portion of the structure to which the clip is attached. In this exemplary embodiment, the one or more second structure engaging members 78 include two pointed edges extending from the long leg 68 of the second clip bracket 62 into the opening 64 of the second clip pocket 60.

Figure 32:
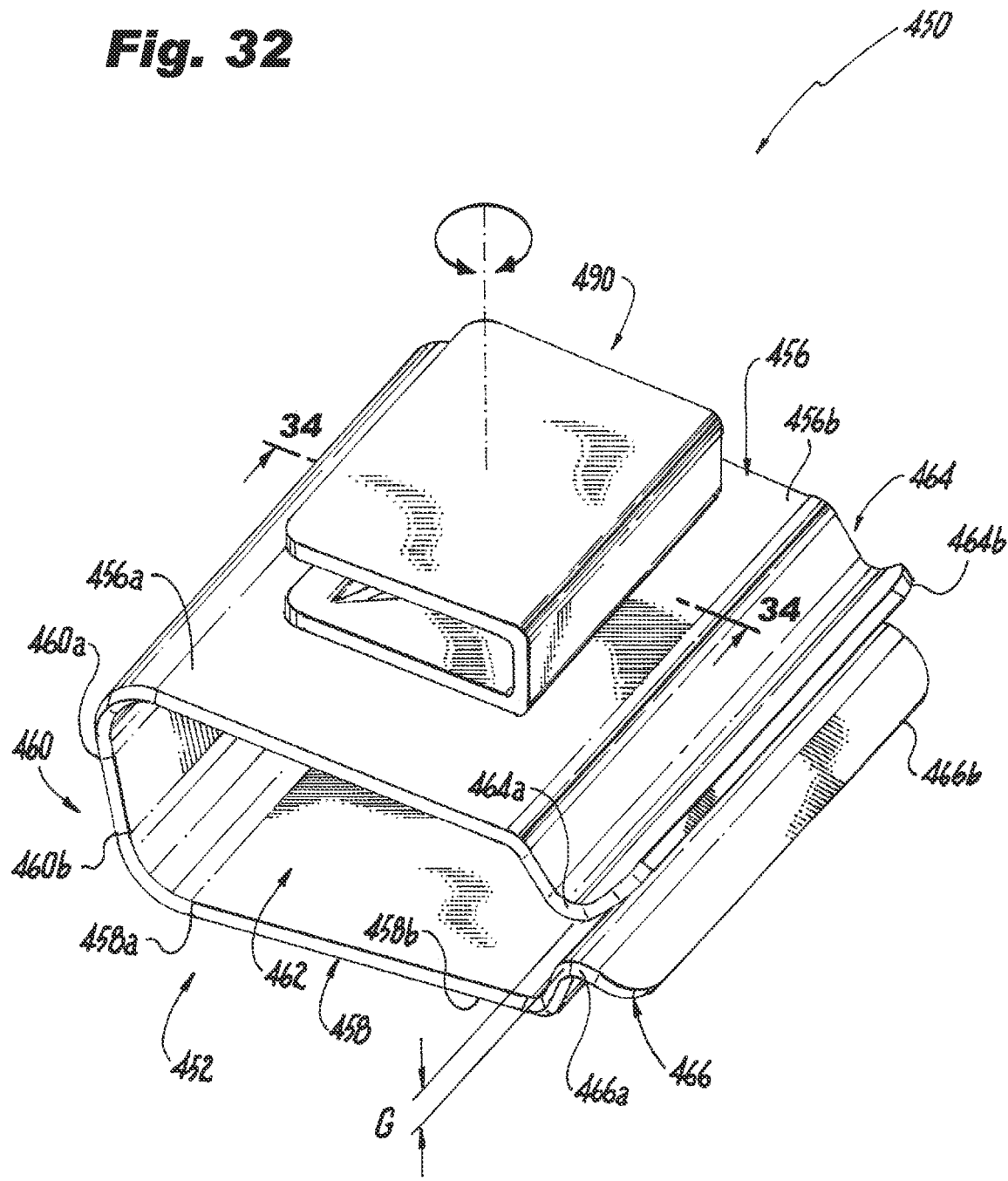
FIG. 32 is a perspective view of another exemplary embodiment of a wire management clip according to the present disclosure, illustrating a clip pocket rotatably attached to an arm of a cable pocket.

Turning now to FIGS. 32-35, another exemplary embodiment of a wire management clip according to the present disclosure is shown. The clip 450 includes one or more cable pockets and one or more clip pockets. In the exemplary embodiment shown, there is a single cable pocket 452 and single clip pocket 490. In this exemplary embodiment, the cable pocket 452 is rotatable relative to the clip pocket 490 to permit adjustment of the position of the clip 450 relative to the structure to which the clip is to be attached. As shown in FIGS. 32-34, the cable pocket 452 is formed by a first arm 456, a second arm 458 and a base 460. The first arm 456, the second arm 458 and the base 460 are configured and dimensioned to form an opening 462 that can receive and hold one or more cables.

Continuing to refer to FIGS. 32-34, the first arm 456 has a first end portion 456*a* and a second end portion 456*b*. The first end portion 456*a* of the first arm 456 may be integrally or monolithically formed to one end 460*a* of the base 460. In another exemplary embodiment, the first end portion 456*a* may be secured to the base 460 using fasteners, welds or adhesives. The second end portion 456*b* of the first arm 456 is a free end that may include a lead-in 464. The lead-in may be a rounded edge, a U-shaped like member, a V-shaped like member or other type of member that facilitates easier entry of cables into the opening 462 of the cable pocket 452, that facilitates the flexing of the first arm 456 relative to the base 460 and/or that facilitates holding cables within the opening 462 of the cable pocket 452. The lead-in 464 is in this exemplary embodiment is a U-shape like member with a curved member 464a and a flared member 464b that facilitates flexing of the first arm 456 relative to the base 460 when inserting a cable into the cable pocket 452.

The second arm 458 has a first end portion 458a and a second end portion 458b. The first end portion 458a of the second arm 458 may be integrally or monolithically formed to one end 460b of the base 460. In another exemplary embodiment, the first end portion 458a may be secured to the base 460 using fasteners, welds or adhesives. The second end portion 458b of the second arm 458 is a free end that may include a lead-in 466. The lead-in 466 may be a rounded edge, a U-shaped like member, a V-shaped like member or other type of member that facilitates easier entry of cables into the cable pocket 452, that facilitates the flexing of the second arm 458 relative to the base 460, and/or that facilitates holding cables within the opening 462 of the cable pocket 452. The lead-in 466 is in this exemplary embodiment a U-shape like member with a curved member 466a and a flared member 466b that facilitates flexing of the second arm 458 relative to the base 460 when inserting a cable into the cable pocket 452. While the lead-ins 464 and 466 are described herein as U-shaped like members, the present disclosure contemplates that the lead-ins may be in a number of different shapes and sizes, such as a rounded edge or V-shaped like member, that facilitate easier insertion of one or more cables into the cable pocket 452, that facilitate the flexing of the first and second arms 456 and 458 relative to the base 460, and/or that facilitate holding cables within the opening 462 of the cable pocket 452. Further, the flared member 464b of lead-in 464 and the flared member 466b of lead-in 466 are bent away from each other, as shown in FIG. 32, to minimize and possibly prevent any sharp edges from coming into contact with cables received in, held by and/or withdrawn from the cable pocket 452.

Continuing to refer to FIG. 32, when the lead-ins 464 and 466 are in a normal state, there is a gap "G" between the curved member 464a of the lead-in 464 and the curved member 466a of the lead-in 466. The gap "G" is generally smaller than a diameter of the one or more cables to be received into and held by the cable pocket 452. Having a gap "G" that is smaller than a diameter of the one or more cables to be received into and held by the cable pocket 452 prevents the one or more cables from exiting the cable pocket 452 unless sufficient force is applied to the lead-in 464 to cause the first arm 456 to move away from the second arm 458, and/or sufficient force is applied to the lead-in 466 to cause the second arm 458 to move away from the first arm 456. For example, in instances where the clip pocket 490 is attached to a structure, seen in FIG. 35, when the second arm 458 is urged away from the first arm 456, the gap "G" between the lead-in 464 and the lead-in 466 increases allowing one or more cables, e.g., cables 602 and 604 seen in FIG. 18, to be inserted between the lead-ins 464 and 466 into the opening 462 of the cable pocket 452, or allowing one or more cables, e.g., cables 602 and 604, to be withdrawn from the opening 462 of the cable pocket 452 via the lead-ins 464 and 466.

Referring again to FIGS. 32 and 33, the clip pocket 490 in this exemplary embodiment is a U-shaped member that is formed by a first clip arm 492, a second clip arm 494 and a third clip arm 496 integrally formed or secured to one end of the first clip arm 492 and the second clip arm 494 such that the first clip arm 492 is spaced from the second clip arm 494 to create an opening 498 therebetween. In this exemplary embodiment, he height "H2" of the third clip arm 496 defines the height of the opening 498 which should be sufficient to permit a portion of a structure, e.g., a flange 112 of the structure 110 seen in FIG. 35, to fit into the opening 498 of the clip pocket 490. For example, if a thickness "T" of the flange 112 of the structure 110 is 1.5 mm, the height "H2" of the third clip arm 496 would be about 2.5 mm. The length "D3" of the first clip arm 492 and the length "D4" of the second clip arm 494 should be sufficient to permit a portion of the structure, e.g., the flange 112 of the structure seen in FIG. 35, to enter at least partially into the opening 498 in the clip pocket 490. For example, if a length "E" of the flange 112 of the structure 110, seen in FIG. 9, is 12 mm, the lengths "D3" and "D4" would be at least about 6 mm. It is noted that the length "D3" of the first clip arm 492 and the length "D4" of the second clip arm 492 may be the same, or they may differ.

Either one or both the first clip arm 492 and the second clip arm 494 may include one or more structure engaging members 500 that extend away from the respective clip arm 492 and/or 494 into the opening 498. The one or more structure engaging members 500 may be provided to improve the grip between the clip pocket 490 and the portion of the structure, e.g., flange 112, to which the wire management clip 450 is to be attached. The structure engaging members 500 may be one or more teeth or pointed edges, one or more tabs or ribs, one or more raised surfaces or other structures that can engage and grip the structure, e.g., flange 112 seen in FIG. 35, or that can engage the structure and create a friction force or a friction fit between the wire management clip 450 and the portion of the structure to which the wire management clip is attached.

As noted above, in this exemplary embodiment, the cable pocket 452 is rotatable relative to the clip pocket 490 to permit adjustment of the position of the clip 450 lead-ins 464 and 466 relative to the structure to which the clip is to be attached. The present disclosure contemplates the numerous known techniques in which one member can be connected to another member such that the two members are rotatable relative to each other. In the exemplary embodiment shown in FIGS. 33 and 34, a ball and socket like configuration is used to make the cable pocket 452 rotatable relative to the clip pocket 490. More specifically, second clip arm 494 includes a ball 510 extending away from the second clip arm 494 as shown in FIG. 33. The ball 510 has a diameter "D5" and forms the ball portion of the ball and socket configuration. To form the socket portion of the ball and socket configuration, the first arm 456 of the cable pocket 452 includes a socket housing 512 extending away from the first arm 456 as shown. The socket housing 512 has an aperture 514 through which the ball 510 of the clip pocket 490 can be press through. It is noted that the socket housing 512 may be a hollow housing, as shown in FIG. 34, or the socket housing 512 may be a solid housing with a bore for receiving the ball 510. A top portion 514a of the aperture 514 may be tapered to help align the ball 510 with the aperture 514. In the exemplary embodiment shown, the socket housing 512 is a hollow housing. The aperture 514 of the socket housing 512 has a diameter "D6" that is less than the diameter "D5" so that when the ball 510 is pressed through the socket aperture 514 the ball remains within the socket housing 512 such that the ball 510 is movable within the socket housing 512. As a result, the cable pocket 452 is movable, e.g., rotatable, relative to the clip pocket 490.

Figure 35:
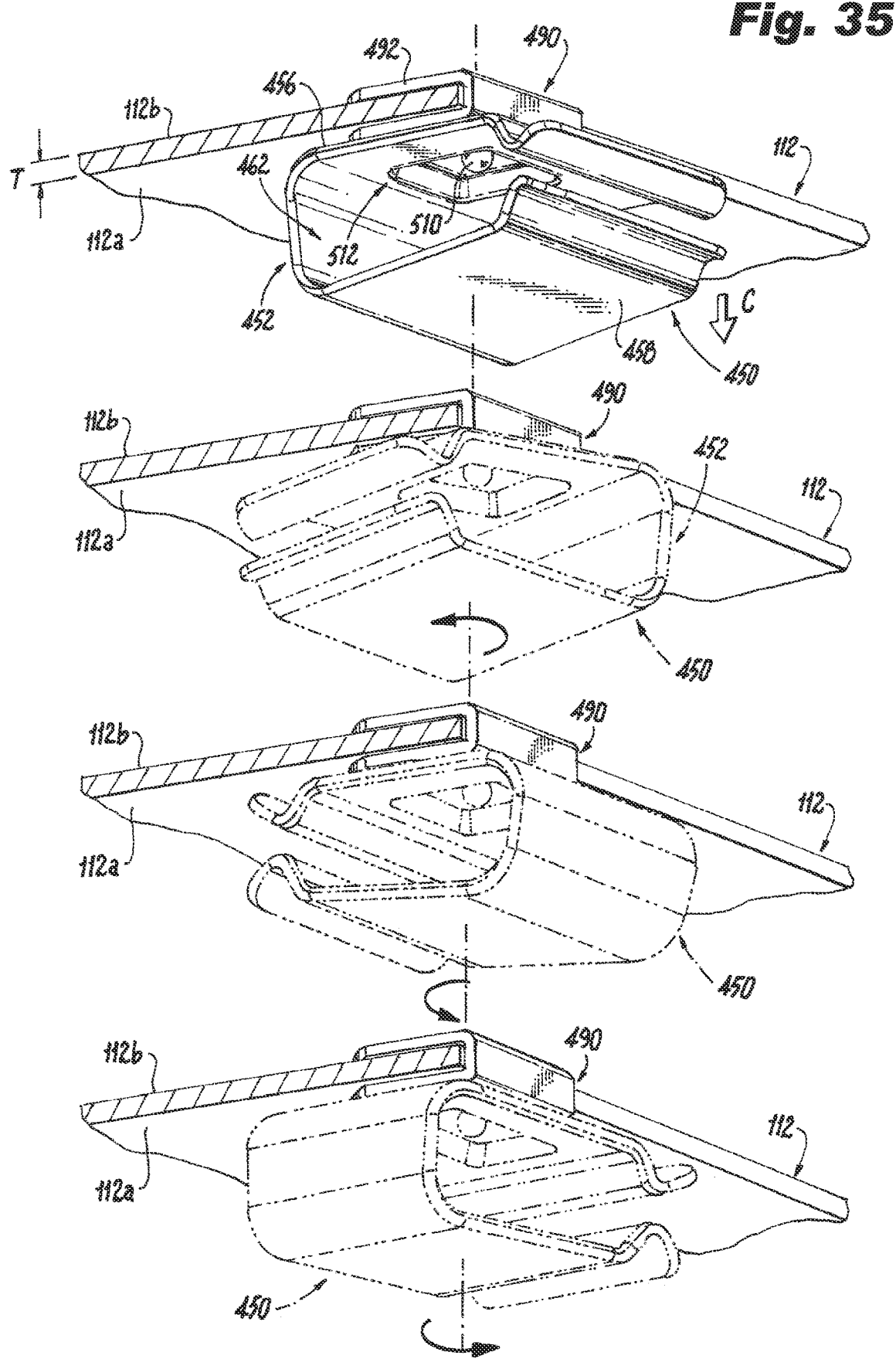
FIG. 35 a bottom perspective view of the wire management clip of FIG. 32 attached to a bottom side of a flange of a frame of a photovoltaic module, illustrating the rotation of the cable pocket of the wire management clip relative to the frame.

Referring to FIG. 35, to attach the clip 450 to the flange 112, the opening 498 of the clip pocket 490 is aligned with the flange and force is applied to, for example, the third clip arm 496 of the clip pocket 490 in the direction of the back wall 114 of the structure 110. As the clip pocket 490 is pressed onto the flange 112, the structure engaging members 500, seen in FIG. 33, engage the bottom surface 112a of the flange and grasps the flange to attach the clip 450 to the flange. In the exemplary embodiment of the clip 450 of FIGS. 32-35, the structure engaging members 500 have a pointed tip that may pierce any non-conductive coatings on the flange 112 so that the clip 450 may be electrically bonded to the structure 110, as described herein above. With the clip 450 attached to the flange 112, the cable pocket 452 can be rotated so that the lead-ins 464 and 466 face a desired direction relative to the flange 112, as shown in FIG. 35. To hold the cable pocket 452 in the set position relative to the clip pocket 490, a rotational stop 516 may be used. Examples of rotational stops include ball detents mechanisms, pawl and ratchet mechanisms, slide stop mechanisms, and detent/indent stop mechanisms. In the exemplary embodiment shown, the rotational stop 516 is a detent/indent stop. More specifically, the outside surface 512a of the socket housing 512 may include one or more indents 518, seen in FIGS. 33 and 34, and the outside surface 494a of the second clip arm 494 may include one or more detents 520 aligned to coincide with the one or more indents 518 so that a detent 520 can rest within an indent 518, as seen in FIG. 34, to hold the cable pocket 452 in the set position relative to the clip pocket 490. Once the cable pocket 452 is in a set position, cables, e.g., cables 602 and 604, can be inserted into the opening 462 of the cable pocket 452. When inserting the cables into the opening 462, the cable contacts the flared member 464b of the lead-in 464 and the flared member 466b of the lead-in 466 and rides along the flared members 464b and 466b causing the second arm 458 of the clip pocket 452 to flex in the direction of arrow "C" so that gap "G" increases sufficient to permit the cable 604 to pass into the opening 462. Once the cable passes the curved member 464a and the curved member 466a of the respective lead-ins 464 and 466, the force applied to the lead-ins 464 and 466 is removed allowing the second arm 458 to return to its normal state. At this point the gap "G" decreases to its normal state holding the cables within the opening 462 of the cable pocket 452.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A wire management clip comprising:
  a cable pocket including:
    a base member;
    a first arm extending from a first end portion of the base member and having a free end, the first arm having at least one structure engaging member extending therefrom;
    a second arm extending from a second end portion of the base member and having a free end such that a cable receiving opening is formed between the first arm and the second arm, the second arm having at least one structure engaging member extending therefrom;
  a first clip pocket extending from the first arm and forming an opening capable of receiving a portion of a structure, the first clip pocket includes at least one structure engaging member extending into the first clip pocket opening;
  a second clip pocket extending from the second arm and forming an opening capable of receiving a portion of the structure, the second clip pocket includes at least one structure engaging member extending into the second clip pocket opening; and
  wherein the first clip pocket opening is oriented to permit entry of the structure from a first direction relative to the wire management clip and the second clip pocket opening is oriented to permit entry of the structure from a second direction relative to the wire management clip.

2. The wire management clip according to claim 1, wherein the free end of the first arm includes a first lead-in, wherein the free end of the second arm includes a second lead-in, and wherein the first lead-in opposes the second lead-in and a gap is formed between the first lead-in and the second lead-in.

3. The wire management clip according to claim 2, wherein the first lead-in facilitates flexing of the first arm, and wherein the second lead-in facilitates flexing of the second arm.

4. The wire management clip according to claim 1, wherein the at least one structure engaging member of the first arm comprises a tooth, a pointed edge or a raised surface, and the at least one structure engaging member of the second arm comprises a tooth, a pointed edge or a raised surface.

5. The wire management clip according to claim 1, wherein the first clip pocket comprises an L-shaped bracket.

6. The wire management clip according to claim 1, wherein the second clip pocket comprises an L-shaped bracket.

7. The wire management clip according to claim 1, wherein at least one structure engaging member of the first clip pocket comprises a tooth, a pointed edge or a raised surface.

8. The wire management clip according to claim 1, wherein at least one structure engaging member of the second clip pocket comprises a tooth, a pointed edge or a raised surface.

9. A wire management clip comprising:
  a cable pocket including:
    a base member;
    a first arm extending from a first end portion of the base member and having a free end with a first lead-in, the first arm having at least one structure engaging member extending therefrom;
    a second arm extending from a second end portion of the base member and having a free end with a second lead-in such that a cable receiving opening is formed between the first arm and the second arm, and such that the second lead-in opposes the first lead-in and a gap is formed between the first lead-in and the second lead-in, the second arm having at least one structure engaging member extending therefrom;
  a first clip pocket extending from the first arm and forming an opening capable of receiving a portion of a structure, the first clip pocket includes at least one structure engaging member extending into the first clip pocket opening;
  a second clip pocket extending from the second arm and forming an opening capable of receiving a portion of the structure, the second clip pocket includes at least one structure engaging member extending into the second clip pocket opening; and
  wherein the first clip pocket opening is oriented to permit entry of the structure from a first direction relative to the wire management clip and the second clip pocket opening is oriented to permit entry of the structure from a second direction relative to the wire management clip.

10. The wire management clip according to claim 9, wherein the at least one structure engaging member of the first arm comprises a tooth, a pointed edge or a raised surface, and the at least one structure engaging member of the second arm comprises a tooth, a pointed edge or a raised surface.

11. The wire management clip according to claim 9, wherein the first lead-in facilitates flexing of the first arm, and wherein the second lead-in facilitates flexing of the second arm.

12. The wire management clip according to claim 9, wherein the first clip pocket comprises an L-shaped bracket.

13. The wire management clip according to claim 9, wherein the second clip pocket comprises an L-shaped bracket.

14. The wire management clip according to claim 9, wherein at least one structure engaging member of the first clip pocket comprises a tooth, a pointed edge or a raised surface.

15. The wire management clip according to claim 9, wherein at least one structure engaging member of the second clip pocket comprises a tooth, a pointed edge or a raised surface.

16. A wire management clip comprising:
a cable pocket including:
a base member;
a first arm extending from a first end portion of the base member and having a free end;
a second arm extending from a second end portion of the base member and having a free end such that a cable receiving opening is formed between the first arm and the second arm;
a first clip pocket extending from the first arm and forming an opening capable of receiving a portion of a structure, the first clip pocket having at least one structure engaging member extending into the first clip pocket opening;
a second clip pocket extending from the second arm and forming an opening capable of receiving a portion of the structure, the second clip pocket having at least one structure engaging member extending into the second clip pocket opening; and
wherein the first clip pocket opening is oriented to permit entry of the structure from a first direction relative to the wire management clip, and the second clip pocket opening is oriented to permit entry of the structure from a second direction relative to the wire management clip.

17. The wire management clip according to claim 16, wherein the free end of the first arm includes a first lead-in, wherein the free end of the second arm includes a second lead-in, and wherein the first lead-in opposes the second lead-in and a gap is formed between the first lead-in and the second lead-in.

18. The wire management clip according to claim 16, wherein the first arm includes at least one structure engaging member extending therefrom, and the second arm includes at least one structure engaging member extending therefrom.

19. The wire management clip according to claim 18, wherein the at least one structure engaging member of the first arm comprises a tooth, a pointed edge or a raised surface, and the at least one structure engaging member of the second arm comprises a tooth, a pointed edge or a raised surface.

20. The wire management clip according to claim 16, wherein the at least one structure engaging member of the first clip pocket comprises a tooth, a pointed edge or a raised surface, and the at least one structure engaging member of the second clip pocket comprises a tooth, a pointed edge or a raised surface.

* * * * *